United States Patent
Heki

(10) Patent No.: US 7,803,292 B2
(45) Date of Patent: Sep. 28, 2010

(54) OPTICAL FILM, OPTICAL FILM MANUFACTURING METHOD AND OPTICAL FILM MANUFACTURING DEVICE

(75) Inventor: Katsuhiko Heki, Hino (JP)

(73) Assignee: Konica Minolta Opto, Inc., Tokyo (JP)

( * ) Notice: Subject to any disclaimer, the term of this patent is extended or adjusted under 35 U.S.C. 154(b) by 474 days.

(21) Appl. No.: 11/640,797

(22) Filed: Dec. 18, 2006

(65) Prior Publication Data

US 2007/0145615 A1    Jun. 28, 2007

(30) Foreign Application Priority Data

Dec. 28, 2005  (JP)  ............... 2005-378137
Jul. 19, 2006  (JP)  ............... 2006-196693

(51) Int. Cl.
*B29D 7/01* (2006.01)

(52) U.S. Cl. ............ 264/1.6; 264/1.34; 264/40.1; 264/175; 264/212; 264/216; 264/217

(58) Field of Classification Search ............ 264/175, 264/176.1, 212, 216, 217, 1.34, 1.6, 40.1
See application file for complete search history.

(56) References Cited

U.S. PATENT DOCUMENTS 3,404,550 A * 10/1968 Plaisted ............ 72/9.2
5,075,060 A * 12/1991 Imataki ............ 264/167
5,158,724 A * 10/1992 Yagi et al. ............ 264/40.1
5,320,787 A * 6/1994 Hayashi et al. ............ 264/1.6
2001/0009312 A1 * 7/2001 Takeda ............ 264/216
2003/0031848 A1 * 2/2003 Sawada et al. ............ 264/216
2006/0066005 A1 * 3/2006 Tanaka ............ 264/216

FOREIGN PATENT DOCUMENTS

JP          10010321 A  *  1/1998
JP       2005-055619 A       3/2005
JP       2005342929 A  * 12/2005

\* cited by examiner

*Primary Examiner*—Joseph S Del Sole
*Assistant Examiner*—Timothy Kennedy
(74) *Attorney, Agent, or Firm*—Frishauf, Holtz, Goodman & Chick, P.C.

(57) ABSTRACT

An optical film producing method, comprises steps of: extruding a melted material including a melted cellulose ester resin from a casting die by using an extruding device; forming a film by pressing the extruded melted material between a first rotating member and a second rotating member; and winding up the formed film, wherein the following formulas are satisfied: $30°\ \text{C.} \leq T1-T2 \leq 60°\ \text{C.}$, $0°\ \text{C.} \leq T2-T3 \leq 20°\ \text{C.}$, $Tg<T3$, where T1 is the temperature of the melted material at an exit of the casting die, T2 is the temperature of the film at a point where the film firstly contacts the first rotating member, T3 is the temperature of the film at a point where the film is pressed between the first rotating member and the second rotating member, and Tg is the glass transition temperature of the film.

13 Claims, 4 Drawing Sheets

OPTICAL FILM, OPTICAL FILM MANUFACTURING METHOD AND OPTICAL FILM MANUFACTURING DEVICE

This application is based on Japanese Patent Application Nos. 2005-378137 filed on Dec. 28, 2005, and 2006-196693 filed on Jul. 19, 2006, the entire contents of which is hereby incorporated by reference.

BACKGROUND OF THE INVENTION

This invention relates to a very flat optical film that is formed by the melt casting method, and relates in particular to functional films such as polarizing plate protection films, retardation films and view angle expanding films used in liquid crystal display devices and antireflection films used in plasma displays, as well as optical films that can be used for various functional films such as those used in organic EL displays and the like. This invention also relates to a method for manufacturing these films.

Liquid crystal display devices are being widely used as monitors based on the fact that space and energy conservation is improved compared to CRT display devices of the prior art. In addition, the use of liquid crystal display devices in television is becoming more widespread. These liquid crystal display devices use various optical films such as polarizing films and retardation films.

However, in the polarizing film of the polarizing plate used in the liquid crystal display device, a protective film which is an optical film formed of a cellulose ester film is layered on one or both surfaces of a polarizing element comprising a stretched polyvinyl alcohol film. The retardation film is used for expanding view angle and improving contrast and the like, and is a film to which retardation has been imparted by stretching films such as polycarbonate, cyclic polyolefin resin and cellulose ester films. These optical films which are also called optical compensation films are required to have no optical defects, uniform retardation and in particular, there must be no variation in the phase axis. As monitor and TV become larger in size and have higher definition, the quality requirements become more stringent.

The methods for manufacturing optical films are largely divided into the melt casting method and the liquid casting method. The former method is one in which a polymer is melted by applying heat and cast on a support, then hardened by cooling. Stretching is then carried out to form a film if necessary. In the latter method, the polymer is dissolved in a solvent and the resultant solution is cast on a support and the solvent is evaporated. Stretching is then carried out to form a film if necessary.

In either of these manufacturing methods, melted polymer or a polymer solution is hardened by cooling or drying on a support. In addition, after being peeled from the support, the polymer is subjected to processing such as drying or stretching while being conveyed using a plurality of conveyance rollers.

In the liquid casting method for manufacturing films, there is a problem in that there is a great load on the environment since large amounts of solvent are used. Meanwhile, since the melt casting method for manufacturing films does not use solvents increased production efficiency can be expected. The melt casting method is preferable in view of environmental protection, but the film that has been formed by melt casting has the disadvantage that thickness is uneven compared to that formed using liquid casting.

Methods that have been proposed in order to improve unevenness in thickness due to die lines on the surface of the film that is formed by melt casting using norbornene resin include employing T dies that have been subjected to surface processing at the die lip portion; performing a step of adhering the film that has been extruded from the dies to a cold drum at atmospheric pressure of 50 kPa or less; and using a rust inhibitor in the dies and the like (See Patent Document 1 for example.)

[Patent Document 1] Japanese Patent Application Laid-Open Publication No. 2005-55619

In films having cellulose resin as the main component material, in addition to properties such as optical uniformity, and few optical defects, adhesion to the polarizing plate is excellent and it has adequate vapor permeability when being adhered to the polarizing plate that has been subjected to wet stretching and thus the above methods for manufacturing polarizing plate protection films are favorable. In addition, as televisions become bigger and lighter in weight, it is important that film surface flatness is ensured even in films wider than 1500 mm and in films which are thicker than 100 μm.

The film having norbornene resin as the main component which uses the technology disclosed in Patent Document 1, to some extent allows the surface smoothness consistent with the stringent product quality requirements of today's market.

However, if the same manufacturing method is used for the norbornene resin as that used in the case of the cellulose resin, films of the same quality could not be formed. In particular, it was difficult to obtain a high degree of smoothness if the size of the film is such that the width exceeds 1500 mm and the thickness is less than 100 μm.

The reason for this is not clear, but it is presumed that this is because viscosity changes due to temperature is large for the cellulose ester resin and the melting behavior is very different from that of the norbornene polymer.

SUMMARY OF THE INVENTION

The object of this invention is to solve the problems described above and provide a method and device for manufacturing an optical film with little unevenness in film thickness by melt casting using cellulose resin.

The above object can be attained by the following techniques.

Item 1.

An optical film producing method, comprises steps of:

extruding a melted material including a melted cellulose ester resin from a casting die onto a first rotating member by using an extruding device; and forming a film by pressing the extruded melted material between the first rotating member and a second rotating member;

wherein the following formulas are satisfied:

$$30° C. \leq T1-T2 \leq 60° C.$$

$$0° C. \leq T2-T3 \leq 20° C.$$

$$Tg < T3$$

where T1 is the temperature of the melted material at an exit of the casting die, T2 is the temperature of the film at a point where the film firstly contacts the first rotating member, T3 is the temperature of the film at a point where the film is pressed between the first rotating member and the second rotating member, and Tg is the glass transition temperature of the film.

Item 2.

The optical film producing method described in Item 1, wherein T1 is set within a temperature range represented by the formula of (Tg+60° C.<T1<Tg+130° C.)

Item 3.

The optical film producing method described in Item 1, wherein T2 is set within a temperature range represented by the formula of (Tg<T2<Tg+120° C.).

Item 4.

The optical film producing method described in any one of Items 1, wherein T3 is set within a temperature range represented by the formula of (T3<Tg+110° C.).

Item 5.

The optical film producing method described in Item 1, wherein the surface of the second rotating member is structured with a metal having a thickness of 1 mm to 10 mm.

Item 6.

The optical film producing method described in Item 5, wherein the second rotating member has a roll form in which the external diameter at a central portion thereof is larger than the external diameters of both end portions thereof.

Item 7.

The optical film producing method described in Item 5 or 6, wherein the process of forming a film by pressing the extruded melted material between a first rotating member and a second rotating member makes an average film thickness to be 15 μm to 80 μm.

Item 8.

The optical film producing method described in any one of Items 5 to 7, wherein the width of the casting die exit along a longitudinal direction of the casting die exit is 1500 mm to 4000 mm.

Item 9.

An optical film produced by the optical film producing method described in any one of Items 1 to 8.

According to the manufacturing method of this invention, the temperature T1 of the film at the exit of the casting die and the temperature T2 of the film at the point when it first contacts the first rotating member surface are set within the temperature range represented by 30° C.≦T1−T2≦60° C. The resin that has been extruded from the casting die is successively cooled at the first rotating member and then the second rotating member, but if temperature reduction up until the point where the extruded resin contacts the first rotating member is too high, there is non-uniform contraction as cooling occurs, and there is a great amount of unevenness in the thickness of the resulting film. In the case of this invention, because a difference (T1−T2) between the temperature T1 at the exit of the casting die and the temperature T2 at the point of contact with the first rotating member is made higher than 60° C., non-uniform contraction is controlled and unevenness in film thickness is suppressed. On the other hand, in order to make the difference (T1−T2) less than 30° C., large equipment for preventing reduction in the temperature of the resin become necessary and this leads to increased cost and is therefore not favorable.

If a difference (T2−T3) between the temperature T2 at the point of contact with the first rotating member and the temperature T3 of the film at a point where the film is sandwiched between the first and second rotating members is kept less than 20° C., non-uniform cooling due to additional cooling by the time the resin reaches the second rotating member is controlled.

In addition to the shortcoming that there is a great amount of unevenness in film thickness described above, the melt casting method has another shortcoming in that die lines tend to occur due to cracks or foreign particles in the casting die.

In this invention, the die lines can be sufficiently corrected at the cooling step.

More specifically, if the temperature T1 at the exit of the casting die is less than Tg+60° C., the viscosity of the resin compound will be too high and the height of the die lines will be high. Conversely, if T1 is greater than Tg+130° C., deterioration of the resin mixture occurs and smoothness of the film surface is compromised. In addition, if the temperature T2 of the film when it first contacts the first rotating member surface or the temperature T3 of the film when it is nipped using pressure between the first rotating member and the second rotating member is less than Tg, die line correction cannot be done. Conversely, if T2 is greater than Tg+130° C., or T3 is greater than Tg+120° C., adhesion of film surface with the first and second rotating bodies is not uniform and, as expected, die line correction cannot be done.

DETAILED DESCRIPTION OF THE PREFERRED EMBODIMENT

Figure 1:
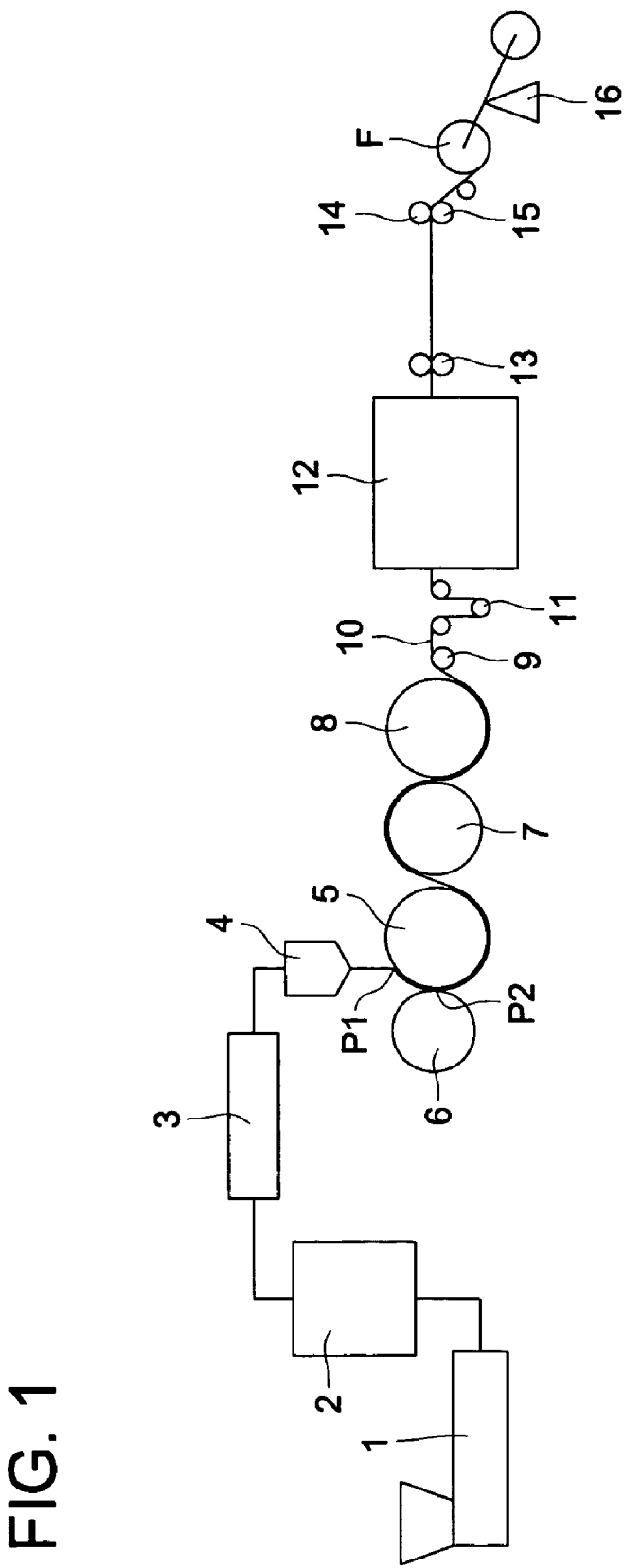
FIG. 1 is a schematic flow sheet of an embodiment of the device for performing the method for manufacturing the optical film of this invention.

Referring to drawings, the following describes the details of the best embodiment for embodying the present invention, without the present invention being restricted thereto.

The present invention relates to the optical film manufacturing method that can be used especially in the protective film for the polarizing plate of a liquid crystal display apparatus.

The optical film as an object of the present invention refers to a functional film used in various types of displays such as a liquid crystal display, plasma display and organic electroluminescent display—especially in a liquid crystal display. It includes a polarizing plate protective film, retardation film, antireflection film, enhanced brightness film, and optical compensation film with enlarged angle of field—especially a retardation film.

The optical film manufacturing method as an embodiment of the present invention is based on the melt-casting film formation method. In the melt-casting film formation method, the film constituent material is heated. When the material has been fluidized, the aforementioned material is melt-extruded on a rotary support member (e.g., cooling roll, cooling drum or endless belt), whereby a film is formed.

When a film is formed by the melt-casting film formation method, the presence of volatile components in the cast material will adversely affect the flatness and transparency of the film which is to be utilized as an optical film. This is because entry of volatile components in the produced film will reduce the transparency, and will cause a streak (die line) to appear on the film surface when a film is formed through extrusion from a die-slit, with the result that the flatness may deteriorate. For this reason, when a film constituent material is processed to form a film, for the purpose of avoiding generation of volatile components at the time of heating and melting, it is preferred to eliminate the presence of the component that volatilizes in the range of temperature lower than the melting temperature in film formation.

The volatile component includes the moisture absorbed by the film constituting material and the solvent mixed before purchase of the film constituting material or at the time of synthesis. Volatilization is caused by the evaporation, sublimation or decomposition resulting from heating of these components.

The material constituting the optical film as an embodiment of the present invention includes the cellulose resin. If required, a stabilizer and plasticizer are also included. An ultraviolet absorber, a matting agent as a lubricant and retardation inhibitor can also be included if further required. A body material is selected from among these materials according to the requirements of the optical film.

The cellulose resin constituting the optical film in the embodiment of the present invention has the structure of a cellulose ester. It is an amorphous independent or mixed acid ester of cellulose including the structure of at least any one of the aliphatic acyl group and substituted and unsubstituted aromatic acyl groups. The term "amorphous" refers to the state of a solid substance in irregular molecule arrangement without being crystallized. It represents a crystal phase in the form of a material.

The following illustrates an example of the cellulose resin preferably used in the embodiment of the present invention, without the present invention being restricted thereto:

When the cellulose resin includes an aromatic acyl group and the aromatic ring is a benzene ring, the substituent of the benzene ring is exemplified by a halogen atom, cyano, alkyl group, alkoxy group, aryl group, aryloxy group, acyl group, carbonamide group, sulfonamide group, ureido group, aralkyl group, nitro, alkoxy carbonyl group, aryloxy carbonyl group, aralkyloxy carbonyl group, carbamoyl group, sulfamoyl group, acyloxy group, alkenyl group, alkynyl group, alkylsulfonyl group, arylsulfonyl group, alkyloxy sulfonyl group, aryloxy sulfonyl group, alkylsulfonyloxy group and aryloxysulfonyl group, —S—R, —NH—CO—OR, —PH—R, —P(—R)$_2$, —PH—O—R, —P(—R)(—O—R), —P(—O—R)$_2$, —PH(=O)—R—P(=O)(—R)$_2$, —PH(=O)—O—R, —P(=O)(—R)(—O—R), —P(=O)(—O—R)$_2$, —O—PH(=O)—R, —O—P(=O)(—R)$_2$—O—PH(=O)—O—R, —O—P(=O)(—R)(—O—R), —O—P(=O)(—O—R)$_2$, —NH—PH(=O)—R, —NH—P(=O)(—R)(—O—R), —NH—P(=O)(—O—R)$_2$, —SiH$_2$—R, —SiH(—R)$_2$, —Si(—R)$_3$, —O—SiH$_2$—R, —O—SiH(—R)$_2$ and —O—Si(—R)$_3$. The aforementioned R is an aliphatic group, aromatic group or heterocyclic group.

The number of the substituents is 1 through 5, preferably 1 through 4, more preferably 1 through 3, still more preferably 1 or 2. When the number of the substituents to replace the aromatic ring is two or more, they can be the same or different from one another, but they can be combined to form a condensed polycyclic compound (e.g., naphthalene indene, indan, phenanthrene, quinoline, isoquinoline, chromene, chromane, phthalazine, acridine, indole and indoline).

Halogen atom, cyano, alkyl group, alkoxy group, aryl group, aryloxy group, acyl group, carbonamide group, sulfone amide group and ureido group are preferably used as the substituent. Halogen atom, cyano, alkyl group, alkoxy group, aryloxy group, acyl group and carbonamide group are more preferably used. The halogen atom, cyano, alkyl group, alkoxy group and aryloxy group are still more preferably used, and the halogen atom, alkyl group and alkoxy group are most preferably used.

The aforementioned halogen atom includes a fluorine atom, chlorine atom, bromine atom and iodine atom. The aforementioned alkyl group may be either cyclic or branched. The alkyl group contains preferably 1 through 20 carbon atoms, more preferably 1 through 12, still more preferably 1 through 6, most preferably 1 through 4.

The aforementioned alkyl group is exemplified by methyl, ethyl, propyl, isopropyl, butyl, t-butyl, hexyl, cyclo hexyl, octyl and 2-ethylhexyl.

The aforementioned alkoxy group may be either cyclic or branched. The alkoxy group contains preferably 1 through 20 carbon atoms, more preferably 1 through 12, still more preferably 1 through 6, most preferably 1 through 4. The alkoxy group may be replaced by still another alkoxy group. The alkoxy group is exemplified by methoxy, ethoxy, 2-methoxyethoxy, 2-methoxy-2-ethoxyethoxy, butyloxy, hexyloxy and octyloxy.

The aforementioned aryl group contains preferably 6 through 20 carbon atoms, more preferably 6 through 12. The aryl group is exemplified by phenyl and naphthyl. The aforementioned aryloxy group contains preferably 6 through 20 carbon atoms, more preferably 6 through 12.

The aforementioned aryloxy group is exemplified by phenoxy and naphtoxy. The acyl group contains preferably 1 through 20 carbon atoms, more preferably 1 through 12.

The aforementioned acyl group is exemplified by formyl, acetyl and benzoyl. The aforementioned carbonamide group contains preferably 1 through 20 carbon atoms, more preferably 1 through 12.

The aforementioned carbonamide group is exemplified by acetoamide and benzamide. The aforementioned sulfone amide group contains preferably 1 through 20 carbon atoms, more preferably 1 through 12.

The aforementioned sulfone amide group is exemplified by methane sulfone amide, benzene sulfone amide and p-toluene sulfone amide. The aforementioned ureido group contains preferably 1 through 20 carbon atoms, more preferably 1 through 12.

The aforementioned ureido group is exemplified by (unsubstituted) ureido.

The aforementioned aralkyl group contains preferably 7 through 20 carbon atoms, more preferably 7 through 12. The aralkyl group is exemplified by benzyl, phenethyl and naphthylmethyl.

The aforementioned alkoxy carbonyl group contains preferably 1 through 20 carbon atoms, more preferably 2 through 12. The alkoxy carbonyl group is exemplified by methoxy carbonyl.

The aforementioned aryloxy carbonyl group contains preferably 7 through 20 carbon atoms, more preferably 7 through 12. The aryloxy carbonyl group is exemplified by phenoxy carbonyl.

The aforementioned aralkyloxy carbonyl group contains preferably 8 through 20 carbon atoms, more preferably 8 through 12. The aralkyloxy carbonyl group is exemplified by benzyloxy carbonyl.

The aforementioned carbamoyl group contains preferably 1 through 20 carbon atoms, more preferably 1 through 12. The carbamoyl group is exemplified by (unsubstituted) carbamoyl and N-methylcarbamoyl.

The aforementioned sulfamoyl group contains preferably 20 or less carbons, more preferably 12 or less carbons. The sulfamoyl group is exemplified by (unsubstituted) sulfamoyl and N-methylsulfamoyl. The aforementioned acyloxy group contains preferably 1 through 20 carbon atoms, more preferably 2 through 12.

The aforementioned acyloxy group is exemplified by acetoxy and benzoyloxy.

The aforementioned alkenyl group contains preferably 2 through 20 carbon atoms, more preferably 2 through 12. The alkenyl group is exemplified by vinyl, alyl and isopropenyl.

The aforementioned alkynyl group contains preferably 2 through 20 carbon atoms, more preferably 2 through 12. The alkynyl group is exemplified by thienyl.

The aforementioned alkyl sulfonyl group contains preferably 1 through 20 carbon atoms, more preferably 1 through 12.

The aforementioned aryl sulfonyl group contains preferably 6 through 20 carbon atoms, more preferably 6 through 12.

The aforementioned alkyloxy sulfonyl group contains preferably 1 through 20 carbon atoms, more preferably 1 through 12.

The aforementioned aryloxy sulfonyl group contains preferably 6 through 20 carbon atoms, more preferably 6 through 12.

The aforementioned alkylsulfonyloxy group contains preferably 1 through 20 carbon atoms, more preferably 1 through 12.

The aforementioned aryloxysulfonyl group contains preferably 6 through 20 carbon atoms, more preferably 6 through 12.

In the cellulose resin used in the embodiment of the present invention, when the hydrogen atom of the hydroxyl group of cellulose is a fatty acid ester aliphatic acyl group, the examples include aliphatic acyl group containing 2 through 20 carbon atoms. To put it more specifically, examples are acetyl, propionyl, butyryl, isobutyryl, valeryl, pivaloyl, hexanoyl, octanoyl, lauroyl and stearoyl.

In the embodiment of the present invention, the aforementioned aliphatic acyl group includes the group containing a further substituent. The substituent can be exemplified by those mentioned as substituents of the benzene ring when the aromatic ring is a benzene ring in the aforementioned aromatic acyl group.

When a retardation film is to be manufactured as the optical film, at least one substance selected from among the cellulose acetate, cellulose propyonate, cellulose butylate, cellulose acetate propyonate, cellulose acetate butylate, cellulose acetate phthalate, and cellulose phthalate is preferably used as the cellulose resin. Alternatively, the preferably used one is the biodegradable cellulose derivative hybrid graft polymerizer formed by ring opening hybrid graft polymerization between lactone and lactide by addition of a ring opening polymerization catalyst of cyclic ester in the presence of the cellulose derivative described in U.S. Pat. No. 3,715,100. Especially the lactone is preferably the one selected from among the groups made up of β-propiolactone, δ-valerolactone, ε-caprolactone, α,α-dimethyl-β-propiolactone, β-ethyl-δ-valerolactone, α-methyl-ε-caprolactone, β-methyl-ε-caprolactone, γ-methyl-ε-caprolactone and 3,3,5-trimethyl-ε-caprolactone. The cellulose derivative is exemplified by cellulose ester such as cellulose diacetate, cellulose acetate butylate, cellulose acetate propyonate, cellulose acetate phthalate and cellulose nitrate, or cellulose ether such as ethylcellulose, methylcellulose, hydroxypropylcellulose and hydroxypropylmethylcellulose. They can be produced according to the method disclosed in U.S. Pat. No. 3,715,100.

Of these substances, the particularly preferred cellulose resin is exemplified by cellulose acetate, cellulose propyonate, cellulose butylate, cellulose acetate propyonate and cellulose acetate butylate.

The cellulose acetate propyonate as fatty acid ester and cellulose acetate butylate have an acyl group containing 2 through 4 carbon atoms as a substituent. Assume that the acetyl group has a replacement ratio of X, and the propionyl group or butyryl group has a replacement ratio of Y. In this case, both the following formulae (I) and (II) are preferably met at the same time. The replacement ratio is defined as the numerical value wherein the number of the hydroxyl groups replaced by the acyl group is represented in terms of glucose unit.

$$2.5 \leq X+Y \leq 3.0 \quad \text{Formula (I)}$$

$$0 \leq X \leq 2.5 \quad \text{Formula (II)}$$

$$0.3 \leq Y \leq 2.5 \quad \text{Formula (III)}$$

Particularly the cellulose acetate propyonate is preferably used. In this case, $0.5 \leq X \leq 2.5$ and $0.5 \leq Y \leq 2.5$ are preferred, More preferably, $1.0 \leq X \leq 2.0$ and $1.0 \leq Y \leq 2.0$. The portion not replaced by the aforementioned acyl group is normally present as a hydroxyl group. They can be synthesized by a known method.

The cellulose material of the cellulose resin used in the embodiment of the present invention can be a wood pulp or cotton linter. The wood pulp can be a conifer or a broad-leaved tree. The conifer is more preferred. From the viewpoint of separability at the time of film formation, use of the cotton linter is more preferred. The cellulose resins produced therefrom can be used in a mixed form or independently.

In the present invention, it is preferable that the number of luminescent spot foreign particles is minimal. Luminescent spot foreign particles as described herein refer to the foreign matter particles which are measured when two polarized plates are arranged at a right angle to each other (crossed Nichol state) and a cellulose ester film is placed between them. These foreign matter particles cause leakage of light that is observed at the position at right angles to the outside surface of the other polarizing plate when the retardation axis of the polarizing plate protective film is positioned so as to be parallel to the transmission axis of the polarizing plate at one light source side. The polarizing plate used for this evaluation preferably comprises protective film with no luminescent spot foreign particles and it is preferable that a glass plate is used for protecting the polarizer. It is believed that one cause of luminescent spot foreign particles is the unreacted esterified portion of the hydroxide group included in the cellulose resin. The number of luminescent spot foreign particles can be reduced by using a cellulose resin with few luminescent spot foreign particles or by reducing the number foreign matter particles by filtering the cellulose resin that has been melted by applying heat. Also, the thinner the film, the lesser the number of luminescent spot foreign particles per unit of surface area, and thus there is a tendency for the number of luminescent spot foreign particles to be less as the amount of cellulose resin included in the film is reduced.

The number of luminescent spots having a size in the range 5-50 μm of the film observed in a polarized crossed Nichol state is preferably less than 300 per 250 mm² area while the number of luminescent spots having a size of more than 50 μm is preferably zero. More preferably, the number of 5-50 μm luminescent spots is 200 or less.

When the number of luminescent spots is large, there is an adverse effect of the liquid crystal display image. In the case where the retardation film functions as the polarizing plate protection film, the presence of these luminescent spots causes birefringence turbulence and the adverse effect on the image is great.

In the case where the luminescent spot foreign particles are removed by melt filtration, a step for manufacturing the film by melt casting which includes the step of removing the luminescent spots particles is performed continuously.

For the melt casting method which includes a step of filtration of the luminescent spot foreign particles by heat melting, using the plasticizing agent and the cellulose resin described hereinafter as components is preferable when compared to the system in which the plasticizer is not added. This is in view of the fact that the melt temperature is reduced, the removal ratio of the luminescent spot foreign particles is improved and thermal decomposition is avoided. Systems including suitably blended additives described hereinafter such as ultraviolet light absorbers and matting agents may be filtered in the same manner.

Examples of the filter material include those known heretofore such as glass fiber, cellulose fiber, filter paper, and fluorine resins such as tetrafluoroethylene resin, but ceramics and metals are preferably used. Absolute filtration accuracy is preferably 50 μm or less, more preferably 30 μm or less and still more preferably 10 μm or less, and 5 μm or less is even more preferable. The filter materials may be suitably combined and used. The filter material may be the surface type or the depth type, but the depth type is less likely to block up and is thus preferable.

In a separate embodiment, before heat is applied to melt the components of the film, for at least the cellulose resin component, in at least one of the process of latter stage material synthesis and the process of obtaining the precipitate, the luminescent spot foreign particles can be removed in the solution state, via the same filtration process. At this time, it is preferable that a stabilizing agent is present in the cellulose resin, and after plasticizers which are described hereinafter or other additives such as ultraviolet light absorbers and matting agents are dissolved in the solvent, the solid part of the film components with cellulose resin as the main component can be obtained by removing the solvent and drying.

In addition, in order to achieve the solution state described above, the process of dissolving the component materials in a solvent can be done via a step of cooling at −20° C. At the time of adding one of a stabilizer, a plasticizer or other additive to the cellulose resin, there are no particular limits to the cellulose resin synthesis (preparation) step used in this invention. However, filtration may be performed in order to filter out the luminescent spot foreign particle and undissolved substances in the solution state at least up until the latter stage of the resin synthesis (preparation) step, and then the other additives may be added and then the solid components separated by removing the solvent or by acid analysis and then drying done. At the time of pelletization, the film component materials that have been mixed as a powder can be obtained.

Uniform mixing of the constituent material other than the cellulose resin of the film constituting material with the aforementioned resin effectively provides uniform melting at the time of heating.

Polymer material and oligomer other than the cellulose resin can be selected as appropriate, and can be mixed with the cellulose resin. Such a polymer material and oligomer are preferred to have a high degree of compatibility with the cellulose resin. The transmittance is 80% or more over the entire visible range (400 nm through 800 nm) when a film is formed, preferably 90% or more, more preferably 92% or more. The purpose of mixing at least one of the polymer material and oligomer other than the cellulose resin is to improve the controllability of viscosity at the time of heating and melting, and the physical bodyties of the film subsequent to film processing. The polymer material and oligomer can be interpreted as other additives.

At least one of the stabilizers should be added to the film constituting material before or at the time of heating and melting of the aforementioned cellulose resin. The stabilizer is required to function without being decomposed at the melting temperature for film formation.

The stabilizer includes a hindered phenol antioxidant, acid-acceptor, hindered amine light stabilizer, peroxide decomposer, radical acceptor, metal deactivator and amines. They are disclosed in the Japanese Non-Examined Patent Application Publication (Tokkaihei) 3-199201, Japanese Non-Examined Patent Application Publication (Tokkaihei) 5-1907073, Japanese Non-Examined Patent Application Publication (Tokkaihei) 5-194789, Japanese Non-Examined Patent Application Publication (Tokkaihei) 5-271471, and Japanese Non-Examined Patent Application Publication (Tokkaihei) 6-107854.

The stabilizer is used to prevent oxidation of the film constituting material, to capture the acid produced by decomposition, to prevent or inhibit decomposition caused by radical species due to light or heat, and to check generation of volatile component caused by the degeneration represented by coloring or a reduction in molecular weight or material decomposition, including the decomposition reaction yet to be clarified. To be more specific, addition of stabilizer into the film constituting material is very effective in checking or preventing generation of the volatile component resulting from degeneration and decomposition of the film constituting material other than the stabilizer. Further, the stabilizer itself is required not to generate a volatile component in the range of temperature for melting the film constituting material.

In the meantime, if the film constituting material is heated and melted, the degree of decomposition is increased. This composition may reduce the strength of the aforementioned constituting material resulting from coloring or reduction in the molecular weight. Further, the decomposition of the film constituting material may be accompanied by production of volatile components.

To avoid degeneration and to reduce moisture absorbency of the film constituting material, the constitutent materials can be divided into one or more types of pellet for storage. Pelletization improves the mixability and compatibility, or allows the optical uniformity of the film to be ensured in some cases.

At the time of heating and melting the film constituting material, the presence of a stabilizer is preferred, because the stabilizer minimizes the reduction in strength caused by deterioration and decomposition of the material, or maintains the strength intrinsic to the material.

When the retardation film is manufactured, addition of a stabilizer is preferred. In the step of providing retardation as a retardation film in the production of a film, the stabilizer minimizes reduction in the deterioration of the strength of the aforementioned film constituting material, or maintains the strength inherent to the material. If the film constituting material is embrittled by considerable deterioration, breakage tends to occur in the step of orientation at the time of film formation. This is because retardation value as a retardation film cannot be ensured in some cases.

Further, the presence of the stabilizer is important because it reduces generation of a colored object in the visible light area at the time of heating and melting, and reduces or removes the factors undesirable to the retardation film such as transmittance or haze value caused by entry of the volatile component into the film. The haze value is less than 1%, preferably less than 0.5%.

In the film constituting material storage or film making process, deterioration may be caused by the presence of oxygen in the air. In this case, means can be provided to reduce the density of oxygen in the air, in addition to the method of using the stabilizing function of the stabilizer. Such means can be exemplified by the known technology of using the nitrogen or argon as an inert gas, deaeration under reduced pressure or under vacuum, and operation in an enclosed environment. At least one of these three methods can be used together with the method wherein the aforementioned stabilizer is present. When the probability of the film constituting material contacting the oxygen in the air is reduced, deterioration of the aforementioned material can be reduced.

When the retardation film is used as a polarizing plate protective film, the aforementioned stabilizer should be incorporated in the film constituting material in order to improve the chronological keeping quality with respect to the polarizer constituting the polarizing plate and polarizing plate.

In the liquid crystal display apparatus using a polarizing plate, presence of the aforementioned stabilizer in the retardation film improves the chronological keeping quality of the retardation film and provides the optical compensation function for a long period of time.

A known compound can be used as the hindered phenol antioxidant compound contributing to stabilization at the time of heating and melting the film constituting material. It is exemplified by a 2,6-dialkyl phenol derivative compound including the compound disclosed in the 12th through 14th columns of the Specification in the U.S. Pat. No. 4,839,405. The hindered phenol based antioxidant compound is commercially available, for example, under the trade name of "Irganox 1076" and "Irganox 1010" manufactured by Ciba Specialty Chemicals K.K.

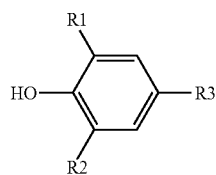

Formula 1

In the above formula, R1, R2 and R3 are each a substituted or unsubstituted alkyl group. Concrete examples of the hindered phenol compound include n-octadecyl 3-(3,5-di-t-butyl-4-hydroxyphenyl)propionate, n-octadecyl 3-(3,5-di t-butyl-4-hydroxyphenyl)acetate, n-octadecyl 3,5-di t-butyl-4-hydroxybenzoate, n-hexyl 3,5-di-t-butyl-4-hydroxyphenylbenzoate, n-dodecyl 3,5-di-t-butyl-4-hydroxyphenylbenzoate, neododecyl 3-(dodecyl β-(3,5-di-t-butyl-4-hydroxyphenyl)propionate, ethyl α-(4-hydroxy-3,5-di-t-butylphenyl)isobutylate, octadecyl α-(4-hydroxy-3,5-di-t-butylphenyl)isobutylate, octadecyl α-(4-hydroxy-3,5-di-t-butyl-4-hydroxyphenyl)propionate, 2-(n-octyl)ethyl 3,5-di-t-butyl-e-hydroxybenzoate, 2-(n-octyl)ethyl 3,5-di-t-butyl-4-hydroxyphenylacetate, 2-(n-octadecylthio)ethyl 3,5-di-t-butyl-4-hydroxyphenyl-acetate, 2-(n-octadecylthio) ethyl 3,5-di-t-butyl-4-hydroxybenzoate, 2-(2-hydroxyethylthio)ethyl 3,5-di-t-butyl-4-hydroxybenzoate, diethylglycol bis-(3,5-di-t-butyl-4-hydroxyphenyl)propionate, 2-(n-octadecylthio)ethyl 3-(3,5-di-t-butyl-4-hydroxyphenyl)propionate, stearylamido N,N-bis[ethylene 3-(3,5-di-t-butyl-4-hydroxyphenyl)-propionate], n-butylimino N,N-bis-[ethylene 3-(3,5-di-t-butyl-4-hydroxyphenyl)propionate], 2-(2-stearoylo-xyethylthio)ethyl 3,5-di-t-butyl-4-hydroxybenzoate, 2-(2-stearoylo-xyethylthio)ethyl 7-(3-methyl-5-t-butyl-4-hydroxyphenyl)heptanoate, 1,2-propylene glycol bis-[3-(3,5-di-t-butyl-4-hydroxyphenyl)propionate], ethylene glycol bis-[3-(3,5-di-t-butyl-4-hydroxyphenyl)-propionate], neopentyl glycol bis-[3-(3,5-di-t-butyl-4-hydroxyphenyl)propionate], ethylene glycol bis-(3,5-di-t-butyl-4-hydroxyphenylacetate), glycerol 1-n-octadecanoate-2, 3-bis-(3,5-di-t-butyl-4-hdyroxyphenylacetate), pentaerythrytol tetrakis[3-(3,5-di-t-butyl-4'-hydroxyphenyl) propionate], 1,1,1-trimethylolethane tris[3-(3,5-di-t-butyl-hydroxyphenyl)propionate], sorbitol hexa-[3-(3,5-di-t-butyl-hydroxyphenyl)propionate], 2-hydroxyethyl 7-(3,5-di-t-butyl-hydroxyphenyl)propionate, 2-stearoyloxyethyl 7-(3,5-di-t-butyl-hydroxyphenyl)-heptanoate, 1,6-n-hexanediol bis-[(3,5-di-t-butyl-4-hydroxyphenyl)propionate] and pentaerythrytol tetrakis(3,5-di-t-butyl-4-hydroxycinnamate).

The above-described type hindered phenol antioxidant is, for example, available on the market under the commercial name of Irganox 1076 and Irganox 1010 of Ciba Specialty Chemicals.

The epoxy compound described in the Specification of the U.S. Pat. No. 4,137,201 is preferably included as a acid-acceptor contributing to stabilization at the time of heating and melting the film constituting material. Such a compound is already known in the aforementioned technical field. It is exemplified by the diglycidyl ether of various polyglycols; polyglycol induced by condensation of about 8 through 40 moles of ethylene oxide per mole of polyglycol in particular; a metallic epoxy compound such as diglycidyl ether of glycerol (e.g. the compound having been used so far together with polyvinyl chloride polymer composition in the polyvinyl chloride polymer composition); epoxidized ether condensed product; diglycidyl ether of the bisphenol A (e.g., 4,4'-dihydroxydiphenyl dimethyl methane); epoxidized unsaturated fatty acid ester (particularly, the alkyl ester containing about 4 through 2 carbon atoms of the fatty acid of this carbon atom having about 2 through 22 (e.g., butyl epoxy stearate); and various epoxidized long chain fatty acid triglyceride (e.g., epoxidized plant oil and other unsaturated natural gas (sometimes called the epoxidized natural glyceride or unsaturated fatty acid wherein these fatty acid generally contain 12 through 22 carbon atoms)) represented and illustrated by the compound of epoxidized soy bean oil). An epoxy group-containing epoxide resin compound available on the market EPON815c, manufacture by Miller-Stephenson Chemical Co., Ltd., and an epoxide ether oligomer condensation product represented by Formula 8 are particularly preferable.

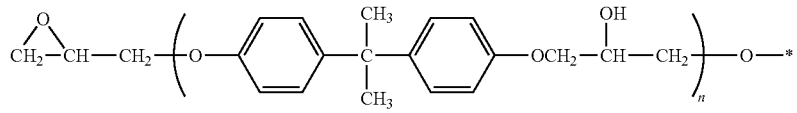

Formula 2

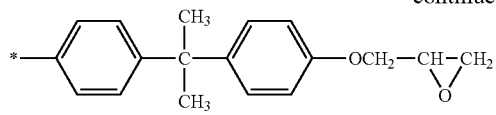

In the above formula, n is an integer of from 0 to 12.

Further employable acid capturing agent includes those described in Tokkai Hei 5-194788, paragraphs 87 to 105.

A known compound can be used as the hindered amine light stabilizer (HALS) contributing to the stabilization at the time of heating and melting of the film constituting material. To put it more specifically, it is exemplified by 2,2,6,6-tetraalkyl piperidine compound, the acid added salt thereof, or the complex between the same and metallic compound, as described in the 5th through 11th columns in the Specification of the U.S. Pat. No. 4,619,956 and in the 3rd through 5th columns in the Specification of the U.S. Pat. No. 4,839,405. Such the compounds include a compound represented by Formula 3.

Formula 3

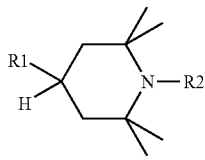

In the above formula, R1 and R2 are each a hydrogen atom or a substituent.

Concrete examples of the hindered amine photostabilizer include 4-hydroxy-2,2,6,6-tetramethylpiperidine, a allyl-4-hydroxy-2,2,6,6-tetramethylpiperidine, 1-benzyl-4-hydroxy-2,2,6,6-tetramethyl-piperidine, 1-(4-t-butyl-2-butenyl)-4-hydroxy-2,2,6,6-tetramethylpiperidine, 4-stearoyloxy-2,2,6,6-tetramethylpiperidine, 1-ethyl-4-saliciloyloxy-2,2,6,6-tetramethylpiperidine, 4-methacryloyloxy-1,2,2,6,6-pentamethylpiperidine, 1,2,2,6,6-pentamethylpiperidine-4-yl-β(3,5-di-t-butyl-4-hydroxyphenyl)-propionate, 1-benzyl-2,2,6,6-tetramethyl-4-piperidinylamleinate, (di-2,2,6,6-tetramethylpiperidine-4-yl)-adipate, (di-2,2,6,6-tetramethylpiperidine-4-yl)-sebacate, (di-1,2,3,6-tetramethyl-2,6-diethyl-piperidine-4-yl)-sebacate, (di-1-allyl-2,2,6,6-tetramethylpiperidine-4-yl)-phthalate, 1-acetyl-2,2,6,6-tetramethylpiperidine-4-yl)-acetate, trimellitic acid ester of tri-(2,2,6,-tetramethylpiperidine-4-yl), 1-acryloyl-4-benzyloxy-2,2,6,6-tetramthyl-piperidine, di-(1,2,2,6,6-pentamethylpiperidine-4-yl) dibutylmalonate, di-(1,2,3,6-tetramethyl-2,6-diethylpiperidine-4-yl) dibenzylmlonate, dimethyl-bis-(2,2,6,6-tetramethylpieridine-4-oxy)-silane, tris-(1-propyl-2,2,6,6-tetramethylpieridine-4-yl) phosphite, tris-(1-propyl-2,2,6,6-tetramethylpieridine-4-yl) phosphate, N,N'-bis-(2,2,6,6-tetramethylpieridine-4-yl)-hexamethylene-1,6-diacetoamide, 1-acetyl-4-(N-cyclohexylacetamido)-2,2,6,6-tetramethylpieridine, 4-benzylamino-2,2,6,6-tetramethyl-pieridine, N,N'-bis-(2,2,6,6-tetramethylpieridine-4-yl)-N,N'-dibutyl-adipamide, N,N'-bis-(2,2,6,6-tetramethylpieridine-4-yl)-N,N'-dicyclohexyl-(2-hydroxypropylene), N,N'-bis-(2,2,6,6-tetramethylpieridine-4-yl)-p-xylenediamine, 4-(bis-2-hydroxyethyl)-amino-1,2,2,6,6-pentamethylpiperidine, 4-methacrylamido-1,2,2,6,6-pentamethylpiperidine and methyl α-cyano-β-methyl-β-[N-2,2,6,6-tetramethylpieridine-4-yl]]-amino-acrylate.

Preferable hindered amine photo-stabilizer includes the following HALS-1 and HALS-2.

HALS-1)

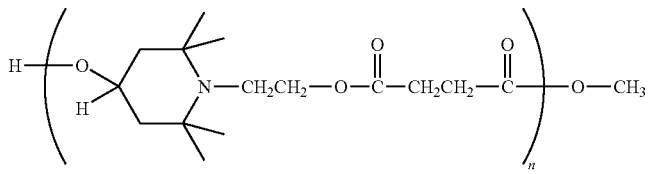

HALS-2)

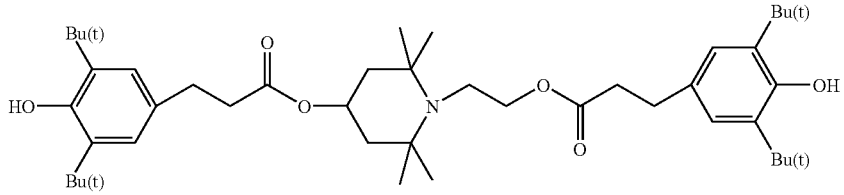

At least one of the stabilizer types can be selected and added. The amount to be added is preferably 0.001 or more percent by mass without exceeding 5 percent by mass with respect to the mass of cellulose resin, more preferably 0.005 or more percent by mass without exceeding 3 percent by mass, still more preferably 0.01 or more percent by mass without exceeding 0.8 percent by mass.

If the amount of the stabilizer to be added is insufficient, the advantages of the stabilizer cannot be used effectively due to a lower effect of stabilization at the time of heating and melting. If the amount of the stabilizer to be added is excessive on the other hand, film transparency will be reduced for the compatibility with resin, and the film will become brittle. This must be avoided.

The stabilizer is preferably mixed before melting the resin. A mixer may be used for this purpose, or mixing may be made in the cellulose resin preparation phase, as described above. It is also possible to make such arrangements that mixing is made at a temperature of the melting point of the resin or more without exceeding that of the stabilizer, and only the stabilizer is melted and is adsorbed on the surface of resin.

Addition of the plasticizer is preferred for the purpose of improving the film quality such as improving mechanical bodyties, providing softness and water repellency, and reducing the moisture transmittance.

In the melt-casting film formation method practiced in the embodiment of the present invention, use of a plasticizer is intended to reduce the film constituting material melting temperature below than the glass transition temperature of the single cellulose resin to be used, or to reduce the viscosity for melting the film constituting material including the plasticizer below that of the single cellulose resin at the same heating temperature.

The film constituting material melting temperature in the sense in which it is used here in the embodiment of the present invention refers to the temperature at which the material is heated when the aforementioned material is fluidized by heating.

When only the cellulose resin is used singly and the temperature is lower than the glass transition temperature, the material is not fluidized to form a film. In the case of the aforementioned resin, however, the modulus of elasticity or viscosity is reduced by absorption of heat at the glass transition temperature or more, and the material is fluidized. To lower the film constituting material melting temperature, the plasticizer to be added is required have a melting point or a glass transition temperature lower than the glass transition temperature of the cellulose resin. This is preferred to achieve the aforementioned object.

For example, a phosphoric acid ester derivative and carboxylic acid ester derivative are preferably used as a plasticizer. It is also preferred to use the polymer obtained by polymerization of the ethylenic unsaturated monomer having a weight average molecular weight of 500 or more without exceeding 10,000 mentioned in the Japanese Non-Examined Patent Application Publication (Tokkai) 2003-12859, the acryl based polymer, the acryl based polymer having an aromatic ring on the side chain, or acryl based polymer having the cyclohexyl group on the side chain.

The phosphoric acid ester derivative is exemplified by triphenyl phosphate, tricresyl phosphate and phenyldiphenylphosphate.

The carboxylic acid ester derivative is exemplified by phthalic acid ester and citric acid ester. The phthalic acid ester derivative is exemplified by dimethylphthalate, diethylphthalate, dicyclohexyl phthalate, dioctylphthalate and diethylhexylphthalate. The citric acid ester is exemplified by citric acid acetyl triethyl and citric acid acetyl tributyl.

Other substances preferably used for the aforementioned purpose are butyl oleate, methylacetyl ricinoleate, dibutyl sebacate, triacetin, trimethylol propane tribenzoate and others. Alkylphthalylalkylglycolate is also used for this purpose. The alkyl of the alkylphthalyl alkylglycolate is an alkyl group containing 1 through 8 carbon atoms. The alkylphthalyl alkylglycolate is exemplified by methylphthalyl methylglycolate, ethylphthalyl ethylglycolate, propylphthalyl propylglycolate, butylphthalyl butylglycolate, octylphthalyl octylglycolate, methylphthalyl ethylglycolate, ethylphthalylmethyl glycolate, ethylphthalylpropyl glycolate, propylphthalyl ethylglycolate, methylphthalyl propylglycolate, methylphthalyl butylglycolate, ethylphthalylbutyl glycolate, butylphthalyl methylglycolate, butylphthalyl ethylglycolate, propyl phthalyl butylglycolate, butylphthalyl propylglycolate, methylphthalyl octylglycolate, ethylphthalyloctyl glycolate, octylphthalyl methylglycolate and octylphthalyl ethylglycolate. Methylphthalyl methylglycolate, ethylphthalyl ethylglycolate, propylphthalyl propylglycolate, butylphthalyl butylglycolate and octylphthalyl octylglycolate are preferably used. In particular, ethylphthalyl ethylglycolate is preferably used. Further, two or more of the alkylphthalyl alkylglycolate and others can be mixed for use.

The amount of the plasticizer to be added is preferably 0.5 percent by mass or more through 20 percent by mass exclusive, with respect to the resin constituting the film constituting material, more preferably 1 percent by mass or more through 11 percent by mass exclusive.

The aforementioned plasticizer is preferred not to generate a volatile component at the time of heating and melting. To put it more specifically, the nonvolatile phosphoric acid ester described in the Japanese Non-Examined Patent Application Publication (Tokuhyohei) 6-501040 can be mentioned as an example. The arylene bis(diaryl phosphate) ester and trimethylol propane tribenzoate as the above illustrated compound can be preferably used, without being restricted thereto. When the volatile component is subjected to the thermal decomposition of the plasticizer, the thermal decomposition temperature Td (1.0) of the plasticizer is defined as the temperature at the time of reduction by 1.0 percent by mass. This requires that the temperature is higher than the film constituting material melting temperature (Tm). This is because, in order to meet the purpose of addition, the amount of the plasticizer to be added to the cellulose resin is greater than that of other film constituting material, and the presence of the volatile component has a serious impact on the deterioration of the quality of the film to be obtained. It should be noted that thermal decomposition temperature Td (1.0) can be measured by the commercially available differential thermogravimetric analyzer (TG-DTA).

For the purpose of preventing the polarizer and display apparatus from being deteriorated by ultraviolet rays, the ultraviolet absorber is characterized by excellent function of absorbing the ultraviolet rays having a wavelength of 370 nm or less. Viewed from the liquid crystal display performance, the absorber is preferred to absorb a smaller amount of the visible light with a wavelength of 400 nm or more. The ultraviolet absorber is exemplified by an oxybenzophenone based compound, benzotriazole based compound, salicylic acid ester based compound, benzophenone based compound, cyanoacrylate based compound and nickel complex salt based compound. The benzophenone based compound and benzotriazole based compound of less coloring are preferably used. It is also possible to use the ultraviolet absorber mentioned in the Japanese Non-Examined Patent Application Publication (Tokkaihei) 10-182621 and Japanese Non-Examined Patent Application Publication (Tokkaihei) 8-337574 and the polymer ultraviolet absorber described in the Japanese Non-Examined Patent Application Publication (Tokkaihei) 6-148430.

The benzotriazole based ultraviolet absorber is exemplified by mixtures of 2-(2'-hydroxy-5'-methylphenyl) benzotriazole, 2-(2'-hydroxy-3',5'-di-tert-butylphenyl) benzotriazole, 2-(2'-hydroxy-3'-tert-butyl-5'-methylphenyl) benzotriazole, 2-(2'-hydroxy-3',5'-di-tert-butylphenyl)-5-chlorobenzotriazole, 2-(2'-hydroxy-3'-(3",4",5",6"-tetrahydrophthalimide methyl)-5'-methylphenyl) benzotriazole, 2,2-methylene bis(4-(1,1,3,3-tetramethylbutyl)-6-(2H-benzotriazole-2-yl) phenol), 2-(2'-hydroxy-3'-tert-butyl-5'-methylphenyl)-5-chlorobenzotriazole, 2-(2H-benzotriazole-2- yl)-6-(straight chain and side chain dodecyl)-4-methylphenol, octyl-3-[3-tert-butyl-4-hydroxy-5-(chloro-2H-benzotriazole-2-yl) phenyl] propyonate and 2-ethylhexyl-3-[3-tert-butyl-4-hydroxy-5-(5-chloro-2H-benzotriazole-2-yl) phenyl] propyonate, without being restricted thereto.

TINUVIN 109, TINUVIN 171, TINUVIN 326 (by Ciba Specialty Chemicals K.K.) can be mentioned as a commercially available.

The benzophenone based compound can be exemplified by 2,4-dihydroxybenzophenone, 2,2'-dihydroxy-4-methoxybenzophenone, 2-hydroxy-4-methoxy-5-sulfobenzophenone, and bis(2-methoxy-4-hydroxy-5-benzoylphenyl methane), without being restricted thereto.

The amount of the ultraviolet absorber to be added is 0.1 through 20 percent by mass with respect to the mass of cellulose resin, preferably 0.5 through 10 percent by mass, more preferably 1 through 5 percent by mass. Two or more types thereof can be added in combination.

The optical film can be provided with a matting agent to improve sliding bodyty, transportability and easy winding.

The matting agent is preferably made of particles as fine as possible. It is exemplified by inorganic particles and crosslinking polymer particles of silicon dioxide, titanium dioxide, aluminum oxide, zirconium oxide, calcium carbide, karyon, talc, sintered calcium silicate, hydrated calcium silicate, aluminum silicate, magnesium silicate and calcium phosphate.

Of the aforementioned substances, silicon dioxide reduces the degree of film haze, and is preferably used. The particles such as silicon dioxide are often surface-treated by an organic substance. They reduce the film haze and are preferably used.

The surface-treated organic substance preferably used is exemplified by halosilane, alkoxy silane, silazane and siloxane. When the average particle size of the particle is greater, the sliding bodyty effect is greater. Conversely, when the average particle size of the particle is smaller, the transparency is superior. Further, the average size of the secondary particle is 0.05 through 1.0 μm. The average size of the secondary particle is preferably 5 through 50 nm, more preferably 7 through 14 nm. The aforementioned particle is preferably used to form projections and depressions having a thickness of 0.01 through 1.0 μm on the film surface. The amount of particles contained therein is preferably 0.005 through 0.3 percent by mass with respect to cellulose resin.

The particle of silicon dioxide is exemplified by AEROSIL 200, 200V, 300, R972, R972V, R974, R202, R812, OX50, and TT600 (by Nippon Aerosil Co., Ltd.). Of these, AEROSIL 200V, R972, R972V, R974, R202 and R812 are preferably used. Two or more of these particles can be used. When two or more of these particles are used, they can be mixed for use in a desired mixing ratio. In this case, the mass ratio of the particles having different average particle size and different materials, for example, the mass ratio of AEROSIL 200V and R972V is 0.1 to 99.9 through 99.9 to 0.1 is preferred for use.

The matting agent is preferably added before the film constituting material is melted, or is preferably included in the film constituting material in advance. For example, after the particles dispersed in a solvent in advance and other additives such as cellulose resin and/or plasticizer and ultraviolet absorber have been mixed and dispersed, the solvent is volatilized. Alternatively, the matting agent is included in the film constituting material in advance by precipitation method. Use of such a film constituting material provides uniform dispersion of the matting agent in the cellulose resin.

Another object of the particles in the film used as a matting agent is to improve the strength of the film as another object.

For example, when a retardation film is manufactured as an optical film, the retardation inhibitor can be added to adjust the retardation. As described in the Specification of European Patent 911,656A2, the aromatic compound having two aromatic rings can be used as a retardation inhibitor. Two or more types of aromatic compounds can be used in combination. In addition to the aromatic hydrocarbon ring, the aromatic ring of the aforementioned aromatic compound includes an aromatic heterocycle. The aromatic heterocycle is particularly preferred. The aromatic heterocycle is generally an unsaturated heterocycle, and 1,3,5-triazine ring is particularly preferred.

When the stabilizer, plasticizer and the aforementioned other additives are added to the cellulose resin, the total amount including them should be 1 percent by mass or more without exceeding 30 percent by mass with respect to the mass of the cellulose resin, preferably 5 through 20 percent by mass.

In the melting and film making process, the film constituting material is required to produce only a small amount of volatile component or no volatile component at all. This is intended to reduce or avoid the possibility of foaming at the time of heating and melting, thereby causing a defect inside the film or deterioration in the flatness on the film surface.

When the film constituting material is melted, the percentage of the volatile component content is 1 percent by mass or less, preferably 0.5 percent by mass or less, more preferably 0.2 percent by mass or less, still more preferably 0.1 percent by mass or less. In the embodiment of the present invention, reduction in heating from 30° C. to 250° C. is measured and calculated using a differential thermogravimetric analyzer (TG/DTA200 by Seiko Electronic Industry Co., Ltd.). This amount is used to represent the amount of the volatile component contained.

Before film formation or at the time of heating, the aforementioned moisture and volatile component represented by the aforementioned solvent is preferably removed from the film constituting material to be used. It can be removed according to a known drying technique. Heating technique, reduced pressure technique or heating/pressure reduction technique can be utilized. The removing operation can be done in the air or under the atmosphere where nitrogen is used as an inert gas. When the aforementioned known drying technique is used, the temperature should be in such a range that the film constituting material is not decomposed. This is preferred to maintain satisfactory film quality.

Drying before formation of a film reduces the possibility of volatile components being generated. It is possible to dry the resin singly or to dry after separation into a mixture or compatible substance between the resin and at least one of the film constituting materials other than resin. The drying temperature is preferably 100° C. or more. If the material to be dried contains a substance having a glass transition temperature, the material may be welded and may become difficult to handle when heated to the drying temperature higher than the glass transition temperature thereof. Thus, the drying temperature is preferably below the glass transition temperature. If a plurality of substances have glass transition temperatures, the lower glass transition temperature is used as a standard. This temperature is preferably 100° C. or more without exceeding (glass transition temperature −5)° C., more preferably 110° C. or more without exceeding (glass transition temperature −20) ° C. The drying time is preferably 0.5 through 24 hours, more preferably 1 through 18 hours, still more preferably 1.5 through 12 hours. If the drying temperature is too low, the volatile component removal rate will be reduced and the drying time will be prolonged. Further, the drying process can be divided into two steps. For example, the drying process may contain two steps; a preliminary drying step for material storage and an immediately preceding drying step to be implemented immediately before film formation through one week before film formation.

The melt-casting film formation method can be classified into molding methods for heating and melting. It is possible to use the melt extrusion molding method, press molding method, inflation method, injection molding method, blow molding method and orientation molding method. Of these, the melt extrusion method is preferred in order to ensure an optical film characterized by excellent mechanical strength and surface accuracy. The following describes the film manufacturing method as an embodiment of the present invention with reference to the melt extrusion method.

Figure 2:
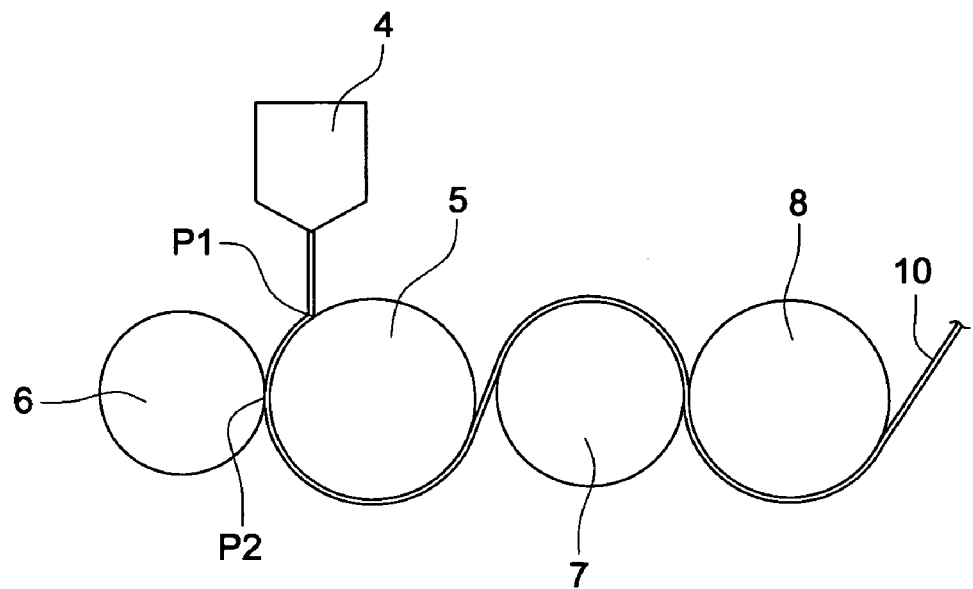
FIG. 2 is an exploded flow sheet of the main parts of the manufacturing device of FIG. 1.
Figure 2:
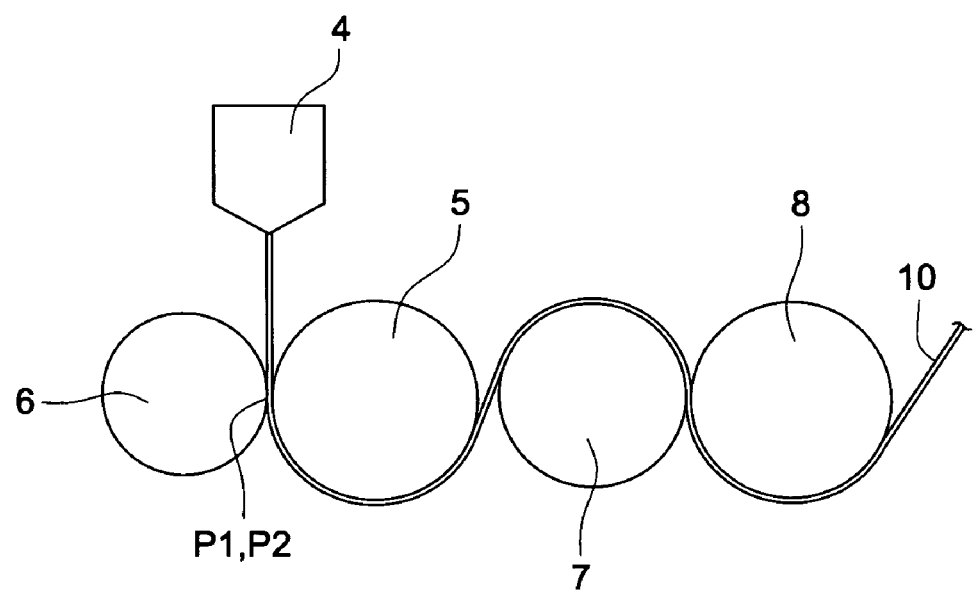

FIG. 1 is a schematic flow sheet of an embodiment of the device for performing the method for manufacturing the optical film of this invention. FIG. 2 is an exploded view of the portion from the cast die to the cooling rollers. FIG. 2 (a) is an embodiment in which the point (P1) when the film first contacts the first cooling roller 5 surface and the point (P2) when the film contacts the touch roller 6 surface is different. FIG. 2(b) is an embodiment in which the point (P1) when the film first contacts the first cooling roller 5 surface and the point (P2) when the film contacts the touch roller 6 surface is the same.

In these embodiments, after the film material comprising the cellulose resin is mixed, melt extrusion is performed from the cast die 4 to the first cooling roller 5 using the extruder 1, and the melted film is brought in external contact with the first cooling roller 5 and also pressed with a prescribed force to the first cooling roller 5 using the touch roller 6. Furthermore, the film is successively brought in external contact with the second cooling roller 7 and the third cooling roller 8 to contact a total of three cooling rollers, and thereby perform hardening by cooling, and then the film is peeled using the peeling roller. The film 10 that is peeled is held at both ends by a stretching device 12 and stretched in the width direction and then wound by the winding device 16.

In this invention, the film (resin mixture) that has been extruded from the casting die 4 is cooled by at least two rotating bodies having a cooling function and then surface correction is done. The rotating member that the film that has been extruded from the casting die 4 first contacts is defined as the first rotating member, and that which it contacts second is defined as the second rotating member. That is to say, in this embodiment, the first cooling roller 5 is the first rotating member and the touch roller 6 is the second rotating member. However, the first rotating member and second rotating member of this invention are not limited to being rollers and may be drums belts or the like.

The second rotating member is for nipping the film using pressure in the direction of the first rotating member using the opposite side of the first rotating member with respect to the film. The surface of the second rotating member is preferably metal and the thickness is between 1 mm and 10 mm. The thickness is more preferably between 2 mm and 6 mm. The surface of the second rotating member is subjected to treatment such as chrome plating and preferably has a surface roughness of 0.2 S or less. The surface of the obtained film will be smooth to the extent that the roller surface is smooth.

The metal material forming the surface of the second rotating member is required to be flat and durable and have suitable elasticity. Carbon steel, stainless steel, titanium and nickel manufactured by electroforming and the like are preferably used. In addition, surface treatment such as hard chrome plating, nickel plating and crystalline chrome plating or ceramic spraying and the like are preferably carried out in order to impart surface roughness and to improve peeling from the resin. The surface that has been subjected to surface processing is preferably further to subjected to polishing such that surface roughness in the above range.

The second rotating member has a double structure of an outer cylinder and an inner cylinder made of metal, and the double cylinder preferably has a space such that cold fluid can flow through.

The inner cylinder is preferably made of a metal that is light and rigid such as carbon steel, stainless steel, aluminum, titanium, or the like. Rotational vibration of the roller can be controlled by causing the inner cylinder to be rigid. The thickness of the inner cylinder is sufficiently rigid when it is 2-10 times the thickness of the outer cylinder. The inner cylinder may be also covered by an elastic material made of resin such as silicone, fluorine rubber and the like.

The structure of the space in which the cold fluid flows should be such that the temperature of the roller surface can be controlled to be uniform, and for example, temperature control can be done by alternating flow back and forth in the width direction or causing the flow to be spiral thus causing temperature distribution on the roller surface to be low. The cold fluid used is not particularly limited and water or oil may be used depending on the temperature region.

In this invention, the second rotating member is preferably a drum in which the outer diameter at the center is larger than the outer diameter at both ends. The touch roller is generally one which presses the film at both ends using a pressurizing means, but because the touch roller will flex in this case, the phenomenon occurs whereby the pressing is greater as the end of the roller is approached. By forming the roller as a drum, highly uniform pressing is possible.

Figure 4:
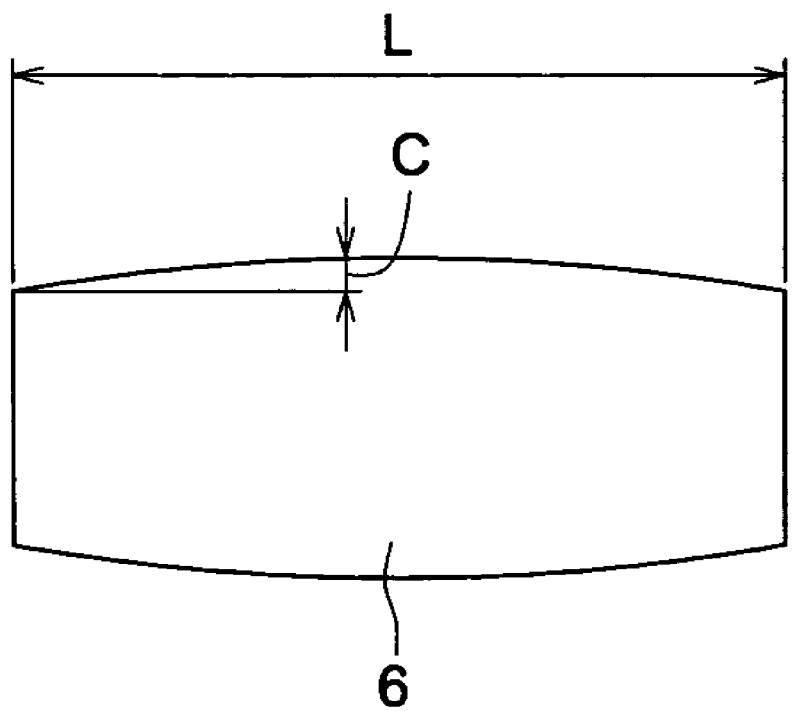
FIG. 4 is an external view of the second rotating member.

FIG. 4 shows the outer appearance of the touch roller 6 which is the second rotating member. In this invention, the diameter of the second rotating member is preferably in the range 200 mm to 500 mm. L in FIG. 4, is the effective width of the touch roller 6 and must be wider than the width of the film to be nipped. C in FIG. 4 is the difference between the diameter at the center of the touch roller 6 and the diameter at the end (called the crowning amount hereinafter). C prevents unevenness such as wrinkling and the like which occurs at the center of the film. The crowning amount is preferably in the range from 50 μm and 300 μm. It is to be noted that an exaggerated crowning amount is shown in FIG. 4.

The second rolling body preferably presses the film with a pressure in the range 1 N/mm to 100 N/mm. In the case where the necking of the film is large and the film end thickness is greater than the center thickness, it is preferable that the outer cylinder at the portion of contact with the thick film portion is shaved. It is to be noted that the outer cylinder portion of the second rotating member that does not press the film is preferably shaved in order to avoid contact with the first rotating member. The shaving amount at this time in the range of 1 μm to 1 mm.

The first cooling roller 5 and the touch roller 6 are positioned at the opposite sides of the film surface so as to nip the film. The film may be contacted at a plane or at line.

In the optical film manufacturing method as an embodiment of the present invention, melt extrusion conditions can be the same as those used for the thermoplastic resin including other polyesters. In this case, the material is preferably dried in advance. A vacuum or pressure reduced dryer and a dehumidified hot air dryer is preferably used to dry so that the moisture will be 1000 ppm or less, more preferably 200 ppm or less.

For example, the cellulose ester based resin dried by hot air, under vacuum or under reduced pressure is extruded by an extruder 1, and is melted at an extrusion temperature of about 200 through 300° C. This material is then filtered by a leaf disk type filter 2 or the like to remove foreign substances.

When the material is introduced from the supply hopper (not illustrated) to the extruder 1, it is preferred to create a vacuum, pressure reduced environment or inert gas atmosphere, thereby preventing decomposition by oxidation.

If such as additive as a plasticizer is not mixed in advance, it can be added and kneaded during the extrusion process in the extruder. A mixing apparatus such as a static mixer 3 is preferably used to ensure uniform addition.

In the embodiment of the present invention, the cellulose resin and the additives such as a stabilizer to be added as required are mixed preferably before melting. The cellulose resin and stabilizer are more preferably mixed first. A mixer may be used for mixing. Alternatively, mixing may be done in the cellulose resin preparation process, as described above. When the mixer is used, it is possible to use a general mixer such as a V-type mixer, conical screw type mixer, horizontal cylindrical type mixer, Henschel mixer and ribbon mixer.

As described above, after the film constituting material has been mixed, the mixture can be directly melted by the extruder 1, thereby forming a film. It is also possible to make such arrangements that, after the film constituting material has been palletized, the aforementioned pellets are melted by the extruder 1, thereby forming a film. Further, when the film constituting material contains a plurality of materials having different melting points, melting is performed at the temperature where only the material of lower melting point can be melted, thereby producing a patchy half-melt. This half-melt is put into the extruder 1, whereby a film is formed. When the film constituting material contains the material that is easily subjected to thermal decomposition, it is preferred to use the method of creating a film directly without producing pellets for the purpose of reducing the frequency of melting, or the method of producing a patchy half-melt followed by the step of forming a film, as described above.

Various types of extruders sold on the market can be used as the extruder 1, and a melting and kneading extruder is preferably used. Either the single-screw extruder or twin screw extruder may be utilized. If a film is produced directly from the film constituting material without manufacturing the pellet, an adequate degree of kneading is required. Accordingly, use of the twin screw extruder is preferred. However, the single-screw extruder can be used when the form of the screw is modified into that of the kneading type screw such as a Maddox type, Unimelt type and Dulmage type, because this modification provides adequate kneading. When the pellet and patchy half-melt is used as a film constituting material, either the single-screw extruder and twin screw extruder can be used.

In the process of cooling inside the extruder 1 or subsequent to extrusion, the density of oxygen is preferably reduced by replacement with such an inert gas as nitrogen gas or by pressure reduction.

The desirable conditions for the melting temperature of the film constituting material inside the extruder 1 differ depending on the viscosity of the film constituting material, discharge rate or the thickness of the sheet to be produced. Generally, the melting temperature is Tg or more without exceeding Tg+100° C. with respect to the glass transition temperature Tg of the film, preferably Tg+10° C. or more without exceeding Tg+90° C. The melting viscosity at the time of extrusion is 10 through 100000 poises, preferably 100 through 10000 poises. Further, the film constituting material retention time in the extruder 1 is preferably shorter. This time is within 5 minutes, preferably within 3 minutes, more preferably within 2 minutes. The retention time depends on the type of the extruder 1 and conditions for extrusion, but can be reduced by adjusting the amount of the material supplied, and L/D, screw speed, and depth of the screw groove.

The shape and speed of the screw of the extruder 1 are adequately selected according to the viscosity of the film constituting material and discharge rate. In the embodiment of the present invention, the shear rate of the extruder 1 is 1/sec. through 10000/sec., preferably 5/sec. through 1000/sec., more preferably 10/sec. through 100/sec.

As an extruder 1 which can be used for the present invention, it can be obtained generally as a plastic molding machine.

The extruder 1 in the embodiment of the present invention can generally be obtained as a plastic molding machine.

The film constituting material extruded from the extruder 1 is sent to the casting die 4 and is extruded from the slit of the casting die 4 in the form of a film. There is restriction to the casting die 4 if it can be used to manufacture a sheet and film. The material of the casting die 4 is exemplified by hard chromium, chromium carbide, chromium nitride, titanium carbide, titanium carbonitride, titanium nitride, cemented carbide and ceramics (e.g., tungsten carbide, aluminum oxide, chromium oxide), which are sprayed or plated, and are subjected to surface treatment by buffing, lapping with a grinding wheel having a count 1000 and after, plane cutting with a diamond wheel having a count 1000 (cutting in the direction perpendicular to the resin flow), electrolytic polishing, and composite electrolytic polishing.

The preferred material of the lip of the casting die 4 is the same as that of the casting die 4. The surface accuracy of the lip is preferably 0.5 S or less, more preferably 0.2 S or less.

In this invention, the resin mixture that has been melted is extruded as a film-like resin from the casting die 4 that is mounted on the extruder, and the extruded film-like resin is adhered to at least two rotating bodies and then taken out.

As shown in FIG. 1 and FIG. 2, in the method for manufacturing an optical film of this invention, the glass transition temperature Tg of the optical film, the film temperature T1 at the casting die 4 exit, the film temperature T2 at the point (P1) of first contact with the first cooling roller 5 surface and the film temperature T3 at the point (P2) of contact with the touch roller 6 surface are set so as to have the following relationships.

$$30° C. \leq T1-T2 \leq 60° C. \quad (A)$$

$$0° C. \leq T2-T3 \leq 20° C. \quad (B)$$

$$Tg < T3 \quad (C)$$

T1 herein is the film temperature at the moment when it is extruded from the lip of the casting die 4 and the temperature can be measured by a commercially available contact type or non-contact type thermometer.

In this invention, 30° C.≦T1−T2≦60° C., or in other words, the temperature reduction from when the resin melt from the casting die 4 to the point of contact with the first cooling roller 5 is 30° C. to 60° C. (as indicated in Formula (A)). If a temperature drop from the casting die 4 to the point of contact with the first cooling roller 5 is more than 60° C., there will be non-uniform contraction as cooling occurs and as a result there will be a great amount of unevenness in the thickness of the obtained film. In order to keep the temperature reduction from the casting die 4 to the point of contact with the first cooling roller 5 less than 60° C., the temperature of the casting die 4 and the first cooling roller 5 vicinity is maintained by providing an enclosure in the space with the casting die 4 and the first cooling roller 5 or by air conditioning of the space inside the enclosure. If temperature reduction from the casting die 4 to the point of contact with the first cooling roller 5 is to be kept to less than 30° C., the insulation device becomes too large and leads to increased cost and is thus not favorable.

In addition, it is preferable that temperature reduction from the first point of contact of the film with the first cooling roller 5 surface to the point of contact with the touch roller 6 surface is preferably 20° C. or less (as indicated in Formula (B)). If temperature reduction from the first point of contact of the film with the first cooling roller 5 surface to the point of contact with the touch roller 6 surface is too large, great unevenness in the film thickness occurs due to non-uniform contraction. In addition, the temperature of the film at a point where the film comes in contact with the surface of the touch roll 6 is set higher than the glass transition temperature Tg (as indicated in Formula (C)). If T3 is lower than Tg, the viscosity of the film becomes too high, film flatness and correction of unevenness in thickness will be insufficient when the film is nipped by the touch roller.

In the manufacturing method of the present invention, by satisfying Formulas (A) to (C), the irregularities in film thickness can be refrained to be small.

Further, in addition to Formulas (A) to (C), it may be preferable to satisfy the following Formulas (D) to (F), and it may be more preferable to satisfy all of Formulas (A) to (F).

$$Tg+60° C.<T1<Tg+130° C. \quad (D)$$

$$Tg<T2<Tg+120° C. \quad (E)$$

$$Tg<T3<Tg+110° C. \quad (F)$$

The film temperature (T1) immediately after extrusion from the casting die 4 is preferably within the range Tg+60° C.<T1<Tg+130° C. (as indicated in Formula (D)). More preferably, T1 is in the range Tg+70° C.<T1<Tg+120° C. and still more preferably in the range. Tg+80° C.<T1<Tg+110° C.

If T1 is less than Tg+60° C., the viscosity of the resin mixture will be too high and the height of the die lines will be too high. If T1 is greater than Tg+130° C., deterioration of the resin mixture will occur and the smoothness of the film surface will be compromised.

Further, in this invention, the temperature (T2) at the time the film contacts the first cooling roller 5 is preferably set within the range Tg<T2<Tg+120° C., and more preferably Tg+10° C.<T2<Tg+100° C., and even more preferably Tg+20° C.<T2<Tg+80° C.

After the film contacts the first cooling roller 5, it contacts the touch roller at the opposite film surface. The temperature (T3) at the time the film contacts the touch roller 6 is preferably set within the range Tg<T3<Tg+110° C. (as indicated in Formula (F)) and more preferably Tg+10° C.<T2<Tg+90° C., and even more preferably Tg+20° C.<T2<Tg+70° C. If the film temperature at the time of contact with the first cooling roller 5 or the touch roller 6 is lower than the above ranges, sufficient die line correction will become difficult. In addition, if this temperature is too high, the roller will not contact the film surface uniformly and die line correction will become difficult.

In this invention, examples of preferable materials for forming the first cooling roller 5 and the touch roller 6 are carbon steel, stainless steel and resin. In addition, increasing surface roughness is preferable and the surface roughness is preferably 0.3 S or less, and more preferably 0.1 S or less. In addition to the solid structure, the touch roller may be have a structure in which a thin metal sleeve is backed up with an elastic roller such as one made of rubber, or it may be a thin metal roller.

In this invention, touch roller 6 is preferably pressed onto the first cooling roller 5 by a pressing means. At this time the linear load with which the touch roller 6 presses onto the film can be adjusted by a pressure piston or the like and is preferably 0.1-100 N/mm and more preferably 1-50 N/mm.

Contact of the first cooling roller 5 or the touch roller 6 with the film may be made more uniform by reducing the diameter at both ends of the roller or by imparting flexibility to the roller surface.

In the embodiment of the present invention, it has been found out that, if the pressure is reduced to 70 kPa or less in the portion from the opening (lip) of the casting die 4 to the first roll 5, the aforementioned die line can be effectively corrected. In this case, this pressure is preferably reduced to 50 kPa or more without exceeding 70 kPa. There is no restriction to the method for ensuring that the pressure in the portion from the opening (lip) of the casting die 4 to the first roll 5 is kept at 70 kPa or less. For example, it is possible to reduce the pressure if the portion around the roll from the casting die 4 is covered with a pressure resistant member. In this case, a suction apparatus is preferably heated by a heater so that a sublimate is not deposited on the apparatus per se. In the embodiment of the present invention, if the suction pressure is too small, a sublime cannot be effectively sucked. This requires an appropriate suction pressure to be selected.

In the embodiment of the present invention, while the molten film-like cellulose ester-based resin coming from the casting die 4 is conveyed by sequential contact with the first roll (the first cooling roll) 5, second cooling roll 7 and third cooling roll 8, the resin is cooled and solidified, whereby an unoriented cellulose ester based resin film 10 is obtained.

In the embodiment of the present invention shown in FIG. 1, the film 10 which is separated from the third cooling roll 8 by the separation roll 9 and is cooled, solidified and unoriented is led to the drawing machine 12 through the dancer roll (film tension adjusting roll) 11. The film 10 is drawn or stretched in the lateral direction (across the width) by this drawing machine (stretching machine). This process of drawing causes the molecules to be oriented in the film.

The film can be drawn across the width preferably by a known tenter. As described above, the film is drawn across the width. This arrangement preferably allows the lamination layer with the polarizing film to be implemented in the form of a roll. Drawing across the width ensures that the low axis of the optical film made up of the cellulose ester based resin film is oriented across the width.

The transmission axis of the polarizing film is also oriented across the width. The polarizing plate is incorporated into the liquid crystal display apparatus, wherein this polarizing plate is laminated in such a way that the transmission axis of the polarizing film and the low axis of the optical film will be parallel to each other. This arrangement improves the display contrast of the liquid crystal display apparatus, and provides an excellent angle of field.

In the manufacturing method of this invention, when the optical film is manufactured, an optical film having a surface roughness Ra of 0.1 μm or less, or 0.05 μm or less is obtained. The variation in the film thickness in the width direction (entire width of the film) is not more than ±3%, and more preferably not more than ±2% with respect to the average film thickness. "Average film thickness" refers to the average value of the thickness of the entire film excluding the both ends (margins) from the necking. The surface roughness of the film and the variation in film thickness may be measured by known methods. For example, for the film surface roughness, there is a method in which the film surface is measured at about 5 mm using a surface roughness meter and compared with the average roughness (Ra). In addition, the film thickness variation may be measured with a film thickness meter, and the standard deviation is determined and width variation with respect to the average film thickness can be compared.

The film that has been peeled from the cooling drum is preferably stretched in a single stage or in multiple stages in the longitudinal direction via one or a plurality of roller groups and/or a heating device such as an infrared heater or the like. At this time, given that the glass transition temperature of the film is Tg, it is preferable that the film is heated in the range between (Tg−30)° C. and (Tg+100)° C. and more preferably in the range between (Tg−20)° C. and (Tg+80)° C. and then stretched in the conveyance direction.

Next, it is preferable that the film that has been stretched in the conveyance direction is stretched transversely in the temperature range between (Tg−20)° C. and (Tg+20)° C., and then fixed by heating.

In the case of transverse stretching, it is preferable that stretching is done while temperature is successively increased at 2 or more stretch regions in which temperature difference is in the range 1-50° C., and thickness in the width direction and optical distribution are reduced.

The glass transition temperature Tg of the film constituting material can be controlled when the types of the materials constituting the film and the proportion of the constituting materials are made different. When the retardation film is manufactured as an optical film, Tg is 120° C. or more, preferably 135° C. or more. In the liquid crystal display apparatus, the film temperature environment is changed in the image display mode by the temperature rise of the apparatus per se, for example, by the temperature rise caused by a light source. In this case, if the Tg of the film is lower than the film working environment temperature, a big change will occur to the retardation value and film geometry resulting from the orientation status of the molecules fixed inside the film by drawing. If the Tg of the film is too high, temperature is raised when the film constituting material is formed into a film. This will increase the amount of energy consumed for heating. Further, the material may be decomposed at the time of forming a film, and this may cause coloring. Thus, Tg is preferably kept at 250° C. or less.

The process of cooling and relaxation under known thermal setting conditions can be applied in the drawing process. Appropriate adjustment should be made to obtain the characteristics required of the intended optical film.

The aforementioned drawing process and thermal setting process are applied as appropriate to provide the phase film function for the purpose of improving the physical bodyties of the phase film and to increase the angle of field in the liquid crystal display apparatus. When such a drawing process and thermal setting process are included, the heating and pressing process in the embodiment of the present invention should be performed prior to the drawing process and thermal setting process.

When a retardation film is produced as an optical film, and the functions of the polarizing plate protective film are combined, control of the refractive index is essential. The refractive index control can be provided by the process of drawing. The process of drawing is preferred. The following describes the method for drawing:

In the retardation film drawing process, required retardations Ro and Rth can be controlled by a drawing magnification of 1.0 through 2.0 in one direction of the cellulose resin, and a drawing magnification of 1.01 through 2.5 times in the direction perpendicular to the inner surface of the film. Here Ro denotes an in-plane retardation. It represents the thickness multiplied by the difference between the refractive index in the longitudinal direction MD in the same plane and that across the width TD. Rth denotes the retardation along the thickness, and represents the thickness multiplied by the difference between the refractive index (an average of the values in the longitudinal direction MD and across the width TD) in the same plane and that along the thickness.

Drawing can be performed sequentially or simultaneously, for example, in the longitudinal direction of the film and in the direction perpendicular in the same plane of the film, namely, across the width. In this case, if the drawing magnification at least in one direction is insufficient, sufficient retardation cannot be obtained. If it is excessive, drawing difficulties may occur and the film may break.

Drawing in the biaxial directions perpendicular to each other is an effectively way for keeping the film refractive indexes nx, ny and nz within a predetermined range. Here nx denotes a refractive index in the longitudinal direction MD, ny indicates that across the width TD, and nz represents that along the thickness.

When the material is drawn in the melt-casting direction, the nz value will be excessive if there is excessive shrinkage across the width. This can be improved by controlling the shrinkage of the film across the width or by drawing across the width. In the case of drawing across the width, distribution may occur to the refractive index across the width. This distribution may appear when a tenter method is utilized. Drawing of the film across the width causes shrinkage force to appear at the center of the film because the ends are fixed in position. This is considered to be what is called "bowing". In this case, bowing can be controlled by drawing in the casting direction, and the distribution of he retardation across the width can be reduced.

Drawing in the biaxial directions perpendicular to each other reduces the fluctuation in the thickness of the obtained film. Excessive fluctuation in the thickness of the retardation film will cause irregularity in retardation. When used for liquid crystal display, irregularity in coloring or the like will occur.

The fluctuation in the thickness of the cellulose resin film is kept within the range of ±3%, preferably ±1%. To achieve the aforementioned object, it is effective to use the method of drawing in the biaxial directions perpendicular to each other. In the final phase, the magnification rate of drawing in the biaxial directions perpendicular to each other is preferably 1.0 through 2.0 in the casting direction, and 1.01 through 2.5 across the width. Drawing in the range of 1.01 through 1.5 in the casting direction and in the range of 1.05 through 2.0 across the width will be more preferred to get a retardation value.

When the absorption axis of the polarizer is present in the longitudinal direction, matching of the transmission axis of the polarizer is found across the width. To get a longer polarizing plate, the retardation film is preferably drawn so as to get a low axis across the width.

When using the cellulose resin to get positive double refraction with respect to stress, drawing across the width will provide the low axis of the retardation film across the width because of the aforementioned arrangement. In this case, to improve display quality, the low axis of the retardation film is preferably located across the width. To get the target retardation value, it is necessary to meet the following condition:

(Drawing magnification across the width)>(drawing magnification in casting direction)

After drawing, the end of the film is trimmed off by a slitter 13 to a width predetermined for the product. Then both ends of the film are knurled (embossed) by a knurling apparatus made up of an emboss ring 14 and back roll 15, and the film is wound by a winder 16. This arrangement prevents sticking in the optical film F (master winding) or scratch. Knurling can be provided by heating and pressing a metallic ring having a pattern of projections and depressions on the lateral surface. The gripping portions of the clips on both ends of the film are normally deformed and cannot be used as a film product. They are therefore cut out and are recycled as a material.

When the retardation film is used as a protective film of the polarizing plate, the thickness of the aforementioned protective film is preferably 10 through 500 μm. Especially the lower limit is 20 μm or more, preferably 35 μm or more. The upper limit is 150 μm is less, preferably 120 μm or less. A particular preferred range is 25 through 90 μm. If the retardation film is too thick, the polarizing plate subsequent to machining will be too thick. This fails to meet low-profile light weight requirements when employed in the liquid crystal display for a notebook PC or mobile type electronic equipment. Conversely, if the retardation film is too thin, retardation as a retardation film cannot occur easily. Further, the film moisture permeability will be increased, with the result that the polarizer cannot be effectively protected from moisture. This must be avoided.

The low axis or high axis of the retardation film is present in the same plane of the film. Assume that the angle formed with the direction of film formation is θ1. Then the θ1 should be −1 degrees or more without exceeding θ1 degrees, preferably −0.5 degrees or more without exceeding +0.5 degrees.

This θ1 can be defined as an orientation angle. It can be measured by an automatic double refractometer KOBRA <21ADH (by Oji Scientific Instruments).

If θ1 meets the aforementioned formula, a high degree of brightness is ensured in the display image and a leakage of light is reduced or prevented, with the result that faithful color representation is provided in the color liquid crystal display apparatus.

When the retardation film as an embodiment of the present invention is used in the multiple-domain VA mode, the arrangement of the retardation film improves the display quality of the image if the high axis of the retardation film is θ1, and the film is arranged in the aforementioned area. When the polarizing plate and liquid crystal display apparatus are set to MVA mode, a structure shown in FIG. 7 can be used, for example.

In FIG. 7, the reference numerals 21a and 21b indicate protective films, 22a and 22b represent retardation films, 25a and 25b show polarizers, 23a and 23b indicate the low-axis directions of the film, 24a and 24b show the directions of the polarizer transmission axis, 26a and 26b denote polarizing plates, 27 shows a liquid crystal cell, and 29 denotes a liquid crystal display apparatus.

The distribution of the retardation Ro in the in-plane direction of the optical film is adjusted to preferably 5% or less, more preferably 2% or less, still more preferably 1.5% or less. Further, the distribution of retardation Rt along the thickness of the film is adjusted to preferably 10% or less, more preferably 2% or less, still more preferably 1.5% or less.

The retardation distribution value is obtained by measuring retardation of the obtained film at 1 cm intervals in the width direction and shows the coefficient of variation (CV) of the obtained retardation. The method for measuring the value of the distribution can be one in which standard deviation using the (n−1) method is obtained for the retardation in the plane and thickness directions respectively, and the coefficient of variation (CV) shown below is obtained and used as an index. In this measurement, the calculation can be done by setting n at 130-140.

Coefficient of variation($CV$)=standard deviation/average value of retardation.

In the retardation film, it is preferable that the retardation value of the distribution variation is small, and when a polarizing plate including a retardation film is used in the liquid crystal display device, it is preferable that the retardation distribution variation is small in view of preventing color unevenness.

The retardation film may have retardation value wavelength dispersion, and in the case where it is used in the liquid crystal element as above, wavelength dispersion can be suitably selected in order to improve display quality. Here, as is the case with the 590 nm measurement value Ro for the retardation film, the planar retardation at 450 nm is defined as R450 and the planar retardation at 650 nm is defined as R650.

In the case when an MVA which is described hereinafter is used, wavelength dispersion in planar retardation of the retardation film is preferably in the range 0.7<(R450/Ro)<1.0 and 1.0<(R650/Ro)<1.5, and more preferably in the range 0.7< (R450/Ro)<0.95 and 1.01<(R650/Ro)<1.2 and even more preferably in the range 0.8<(R450/Ro)<0.93 and 1.02< (R650/Ro)<1.1 in order for color reproduction in the display to be effective.

In order to adjust the retardation film so as to provide the retardation value suited for improvement of the display quality of the liquid crystal cell in the VA mode or TN mode and to divide the aforementioned multi-domain especially in the VA mode for preferable use in the MVA mode, adjustment must be made to ensure that the in-plane retardation Ro is greater than 30 nm without exceeding 95 nm, and retardation Rt along the thickness is greater than 70 nm without exceeding 400 nm.

In the configuration shown in FIG. 7 wherein two polarizing plates are arranged in a crossed-Nicols configuration and a liquid crystal cell is arranged between the polarizing plates, assume a crossed-Nicols configuration with respect to the standard wherein observation is made from the direction normal to the display surface. When viewed from the line normal to the display surface, a deviation occurs from the crossed-Nicols arrangement of the polarizing plate, and causes the leakage of light. This leakage is mainly compensated for by the aforementioned in-plane retardation Ro. In the aforementioned TN mode and VA mode, particularly in the MVA mode, when the liquid crystal cell is set to the black-and-white display mode, the retardation along the thickness mainly compensates for the double refraction of the liquid crystal cell recognized when viewed in a slanting direction in the same manner.

Figure 3:
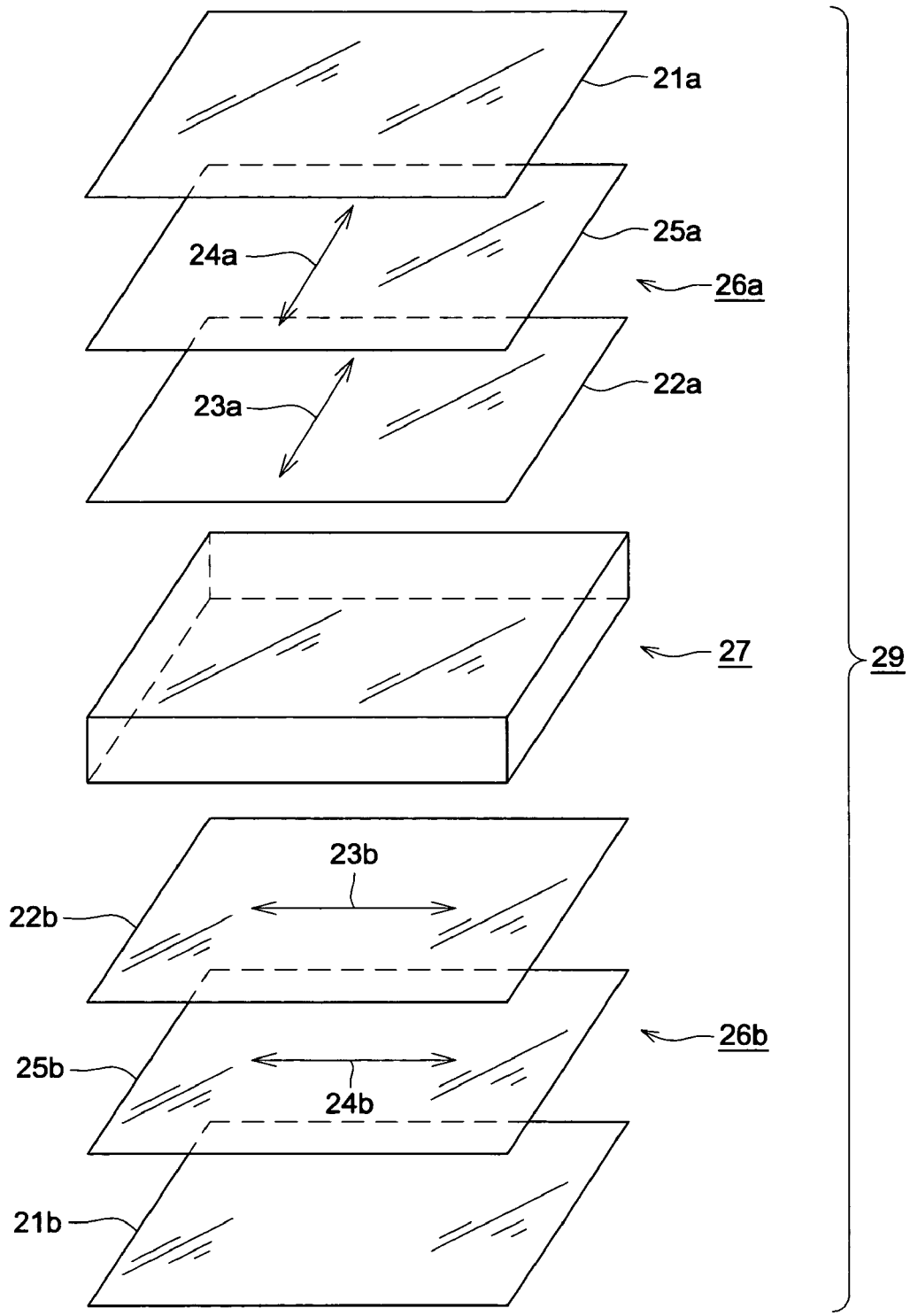
FIG. 3 is an analytic perspective view showing the schematic structure of the liquid crystal display device.

As shown in FIG. 3, when two polarizing plates are arranged on the upper and lower portions of the liquid crystal cell in the liquid crystal display apparatus, the reference numerals 22a and 22b in FIG. 3 are cable of selecting the distribution of retardation Rt along the thickness. It is preferred to ensure that the requirements of the aforementioned range are met, and the total of both of the retardations Rt along the thickness retardation Rt is greater than 140 nm without exceeding 500 nm. In this case, the in-lane retardation Ro of the 22a and 22b and retardation Rt along the thickness retardation Rt are the same. This is preferred to improve the productivity of industrial polarizing plates. It is particularly preferred that the in-plane retardation Ro is greater than 35 nm without exceeding 65 nm, the retardation Rt along the thickness retardation Rt is greater than 90 nm without exceeding 180 nm, and the structure shown in FIG. 3 is applied to the liquid crystal cell in the MVA mode.

In the liquid crystal display apparatus, assume that the TAC film having an in-plane retardation Ro of 0 through 4 nm, a retardation Rt along the thickness of 20 through 50 nm and a thickness of 35 through 85 µm is used at the position 22b in FIG. 3 as one of the polarizing plates, for example, as a commercially available polarizing plate protective film, for example. In this case, the polarizing film arranged on the other polarizing plate, for example, the polarizing film arranged in 22a of FIG. 3 is preferred to have an in-plane retardation Ro of greater than 30 nm without exceeding 95 nm, and the retardation Rt along the thickness of greater than 140 nm without exceeding 400 nm. This arrangement improves the display quality and film productivity.

<Liquid Crystal Display Apparatus>

The polarizing plate including the retardation film in the embodiment of the present invention provides higher display quality than the normal polarizing plate. This is particularly suited for use in a multi-domain type liquid crystal display apparatus, more preferably to the multi-domain type liquid crystal display apparatus in the double refraction mode.

To make in multi-domain type is suitable also for improvement in the symmetry of image presentation and various methods are reported, "Okita, Yamauchi: Liquid crystal, 6 (3), 303(2002)".

The polarizing plate of the present invention as an embodiment of the present invention can be used in the MVA (Multi-domain Vertical Alignment) mode, PVA (Patterned Vertical Alignment) mode, CPA (Continuous Pinwheel Alignment) mode and OCB (Optical Compensated Bend) mode, without being restricted to a specific liquid crystal mode or polarizing plate arrangement.

It is desirable that the display quality of a display cell is symmetrical in observation of people. Therefore, when the display cell is a liquid crystal display cell, a domain can be made into multi with priority substantially given to the symmetry at the side of observation. A domain can be divided by adopting a well-known method and the method can be determined in consideration of the nature of a well-known liquid crystal mode by two-dividing method, more preferably four-dividing method.

The liquid crystal display apparatus is coming into practical use as a colored and animation display apparatus. The display quality is improved by the embodiment of the present invention. The improved contrast and enhanced polarizing plate durability ensure faithful animation image display without easy fatigue.

In the liquid crystal display apparatus containing at least the polarizing plate incorporating a retardation film in the embodiment of the present invention, one polarizing plate containing the retardation film in the embodiment of the present invention is arranged on the liquid crystal cell, or two polarizing plates are arranged on both sides of the liquid crystal cell. In this case, the display quality is improved when means are provided to ensure that the side of the retardation film in the embodiment of the present invention contained in the polarizing plate faces the liquid crystal cell of the liquid crystal display apparatus. Then the films 22a and 22b of FIG. 7 face the liquid crystal cell of the liquid crystal display apparatus.

In the aforementioned structure, the retardation film in the embodiment of the present invention provides optical compensation of the liquid crystal cell. When the polarizing plate in the embodiment of the present invention is used in the liquid crystal display apparatus, at least one of the polarizing plates of the liquid crystal display apparatus should be used as a polarizing plate in the embodiment of the present invention. Use of the polarizing plate in the embodiment of the present invention improves the display quality and provides a liquid crystal display apparatus having excellent angle of field.

In the polarizing plate of the embodiment of the present invention, a polarizing plate protective film of cellulose derivative is used on the surface opposite the retardation film as viewed from the polarizer. A general-purpose TAC film or the like can be employed. The polarizing plate protective film located far from the liquid crystal cell can be provided with another functional layer for the purpose of improving the quality of the display apparatus.

For example, in order to avoid reflection, glare, scratch and dust, and to improve brightness, it is possible to bond the aforementioned functional layer onto the film containing a known functional layer as a display or polarizing plate surface in the embodiment of the present invention, without being restricted thereto.

Generally, to ensure stable optical characteristics, the retardation film is required to exhibit small fluctuations in the Ro or Rth as the aforementioned retardation value. Especially, these fluctuations may cause irregularities of an image in the liquid crystal display apparatus in the double refraction mode.

In the long retardation films manufactured using the liquid casting method, the retardation value may change depending on evaporation of an extremely small amount of organic solvent remaining in the film. In the long retardation film is manufactured, stored and transported in a long roll state, and is processed into a polarizing plate by a worker in the polarizing plate manufacturing industry or the like. Thus residual solvent is present and evaporation is reduced as the inside of the roll is approached. As a result, difference in concentration of the small amount of the residual solvent is generated from the outside to the inside of the roll and from both ends to the center of the roll, in the width direction, and these trigger changes with time and variation in the retardation value.

Meanwhile, in this invention, in the long retardation film, because the film is manufactured by melt casting, unlike in liquid casting, there is no solvent to cause evaporation. In this invention, a roll film is obtained in which there is little change with time and variation in the retardation value. This invention is excellent in that the film that is manufactured by melt casting is continuously stretched to obtain a long retardation film.

This long retardation film that is manufactured by melt casting according to this invention is excellent in that, because cellulose resin is the main component, characteristic saponification of the cellulose resin and an alkali processing step can be utilized. In the case where the resin for forming the polarizer is polyvinyl alcohol, as is the case for the polarizing plate protective film of the prior art, the retardation film of this invention can be adhered using completely saponification polyvinyl alcohol solvent. Thus this invention is excellent in that the polarizing plate processing method of the prior art can be used and the long polarizing plate in particular can be used.

The manufacturing effect obtained by this invention is particularly remarkable in a long roll of 100 m or more, and the manufacturing effect for manufacturing polarizing plates is obtained to the extent that the length is increased in 500 m, 2500 m, and 5000 m rolls.

For example, in retardation film manufacturing, the roll length is preferably between 10 m and 5000 m and preferably between 50 m and 4500 m in view of productive efficiency and transporting, and the film width can be suitably selected based on the width of the polarizer and the width used in the manufacturing line.

In addition, in this invention, in the case where the film is manufactured using a wide-width casting die 4 in which the width in the longitudinal direction width of the casting die is between 1500 mm and 4000 mm, the effect of obtaining a highly smooth film is achieved.

In the case where the width in the longitudinal direction of the casting die exit is more than 1500 mm, it is possible to obtain a product which is an optical film with a length that exceeds 2000 mm after stretching is performed. In this invention in order to achieve the effect of obtaining a highly smooth film in particular, the width in the longitudinal direction of the casting die exit should be 1500 mm-4000 mm and more particularly 1700 mm-4000 mm. The film having a casting width that exceeds 4000 mm is not suitable for practical use as it is expected that stability will be low in the subsequent conveyance step.

In the case where the thickness of the film that is nipped between the first rotating member and the second rotating member is 15 μm-80 μm, a film with particularly high level of smoothness can be obtained. In the case where the thickness of the film that is nipped between the first rotating member and the second rotating member is 15 μm-80 μm, after stretching is performed, a product which is a 10 μm-70 μm optical film can be obtained. In the case where the thickness of the film that is nipped between the first rotating member and the second rotating member is thinner than 15 μm, there is a high risk that ends of the first rotating member and the second rotating member will contact each other, and thus this is not favorable.

When manufacturing the retardation film as the embodiment of the present invention, a functional layer such as antistatic layer, hard coated layer, easy glidability, adhesive layer, antiglare layer and barrier layer can be coated before and/or after drawing. In this case, various forms of surface treatment such as corona discharging, plasma processing, medical fluid treatment can be provided wherever required.

In the film making process, the gripping portions of the clips on both ends of the film having been cut can be recycled as the material of the same type or different type of films, after having been pulverized, or after having been pelletized as required.

An optical film of lamination structure can be produced by co-extrusion of the compositions containing cellulose resins having different concentrations of additives such as the aforementioned plasticizer, ultraviolet absorber and matting agent. For example, an optical film made up of a skin layer, core layer and skin layer can be produced. For example, a large quantity of matting agent can be put into the skin layer or the matting agent can be put only into the skin layer. Larger amounts of plasticizer and ultraviolet absorber can be put into the core layer than the skin layer. They can be put only in the core layer. Further, the types of the plasticizer and ultraviolet absorber can be changed in the core layer and skin layer. For example, it is also possible to make such arrangements that the skin layer contains a plasticizer and/or ultraviolet absorber of lower volatility, and that the core layer contains a plasticizer of excellent plasticity or an ultraviolet absorber of excellent ultraviolet absorbing performance. The glass transition temperatures between the skin layer and core layer can be different from each other. The glass transition temperature of the core layer is preferably lower than that of the skin layer. In this case, the glass transition temperatures of both the skin and core are measured, and the average value obtained by calculation from the volume fraction thereof is defined as the aforementioned glass transition temperature Tg so that it is handled in the same manner. Further, the viscosity of the melt including the cellulose ester at the time of melt-casting can be different according to the skin layer or core layer. The viscosity of the skin layer can be greater than that of the core layer. Alternatively, the viscosity of the core layer can be equal to or greater than that of the skin layer.

Assume that the dimension of the film is the standard when left to sand for 24 hours at a temperature of 23° C. with a relative humidity of 55% RH. On this assumption, the dimensional stability of the optical film of the present embodiment is such that the fluctuation of the dimension at 80° C. and 90% RH is within ±2.0% (excl.), preferably within ±1.0% (excl.), more preferably within ±0.5% (excl.).

When the optical film of the present embodiment is used as a protective film of the polarizing plate as the retardation film, if the retardation film has a fluctuation in excess of the aforementioned range, the absolute value of the retardation as a polarizing plate and the orientation angle will deviate from the initial setting. This may cause reduction in the capacity of improving the display quality, or may result in deterioration of the display quality.

The retardation film of the present invention can be used for the polarizing plate protective film. When used as a polarizing plate protective film, there is no restriction to the method of producing the polarizing plate. The polarizing plate can be manufactured by a commonly used method. The retardation film having been obtained is subjected to alkaline treatment. Using an aqueous solution of completely saponified polyvinyl alcohol, the polarizing plate protective film is bonded on both surfaces of the polarizer manufactured by immersion the polyvinyl alcohol film in an iodonium solution and by drawing the same. When this method is used, the retardation film as the polarizing plate protective film in the embodiment of the present invention is directly bonded to at least one of the surfaces of the polarizer.

Instead of the aforementioned alkaline treatment, the film can be provided with simplified adhesion as disclosed in the Japanese Non-Examined Patent Application Publication (Tokkaihei) 6-94915 and Japanese Non-Examined Patent Application Publication (Tokkaihei) 6-118232.

The polarizing plate is made up of a polarizer and a protective film for covering both surfaces thereof. Further, a protective film can be bonded onto one of the surfaces of the aforementioned polarizing plate and a separate film can be bonded on the opposite surface. The protective film and separate film are used to protect the polarizing plate at the time of product inspection before shipment of the polarizing plate. In this case, the protective film is bonded to protect the surface of the polarizing plate, and is used on the surface opposite to the surface wherein the polarizing plate is bonded to the liquid crystal substrate. Further, the separate film is used to cover the adhesive layer to be bonded to the liquid crystal substrate, and is used on the surface wherein the polarizing plate is bonded to the liquid crystal cell.

EXAMPLES

The following is a detailed description of this invention using working examples, but this invention is not to be limited by these working examples.

Working Example 1

Cellulose Acetate Propionate 100 Parts by Weight (Degree of substitution of acetyl group: 1.95, Degree of substitution of propionyl group: 0.7, Number average molecular weight: 75,000; Drying for 5 hours at temperature of 130° C., Glass transition temperature Tg=174° C.)

Trimethylol propane tris (3,4,5-trimethoxybenzoate) 10 parts by weight

IRGANOX-1010 (Manufactured by Chiba Specialty Chemicals Company) 1 part by weight Sumilizer GP (Manufactured by Sumitomo Chemicals) 0.5 parts by weight.

0.05 parts by weight of silica particles and 0.5 parts by weight of UV absorber (TINUVIN 360) were added to the materials above, and mixed in a nitrogen-sealed V-mixer for 30 minutes and then melted at 240° C. using a biaxial extruder equipped with a strand die (PCM 30 manufactured by Ikegai Co., Ltd.) and cylindrical pellets with a length of 4 mm and diameter of 3 mm were formed. At this time the shear rate is set to 25 (mm/s). The obtained pellets were dried at 100° C. for 5 hours such that the water content was 100 ppm, and then supplied to a uniaxial extruder equipped with a T-die with a width of 300 mm (GT-50; Manufactured by Plastics Kogaku Kenkyusho Inc.), and the extruder and the T-die were set at 250° C. and films were formed. The T-die surface was subjected to hard chrome plating to obtain a mirror surface finish with a surface roughness of 0.1 S. The film from the T-die was dropped onto the first cooling roller with a chrome plated mirror surface whose temperature has been adjusted to 110° C.

The film that was in close contact with the first cooling roller 5 was conveyed with a center angle of 10° to the peripheral portion of the first cooling roller 5 and then pressed by the touch roller 6. At this time, contact pressure was 4 N/mm with respect to the entire surface of the 250 mm width of the film. After the pressed film was brought in contact with the first cooling roller 5 at the peripheral portion with the center angle if 150°, the film was successively brought in external contact with the second cooling roller 7 (temperature 110° C.) and the third cooling roller 8 (temperature 80° C.) to contact a total of three cooling rollers, and thereby perform hardening by cooling and form film 10. The film 10 that was peeled using the peeling roller 9 was held at both ends by a stretching device 12 and stretched in the width direction and slit at the film edge (end portion) by a slitter 13 then wound by the winder (winding device) 16 to thereby obtain the cellulose acetate propionate film F.

The extrusion amount and the rotation speed of the wind-up roller are adjusted such that the thickness of the wound film was 80 μm. In addition, the glass transition temperature of the obtained film was 135° C. The edge of the sample obtained was slit. The film center was measured at 10 points in the longitudinal direction with intervals of 5 mm using the film thickness meter (Sony digital micrometer M-30) and the change in film thickness (ΔDmax−ΔDmin) was calculated.

It is to be noted that in this Working Example 1, because the glass transition temperature of the cellulose acetate propionate film was 135° C., the temperature T1 of the film at the casting die 4 exit is calculated using the formula Tg+60° C.<T1<Tg+130° C. and is in the range 195° C.<T1<265° C. When the temperature T2 of the film at the point (P1) when it first contacts the first cooling roller 5 surface is calculated using the formula Tg<T2<Tg+120° C., the temperature range is 135° C.<T2<255° C., and when the temperature T3 of the film at the point (P2) when it contacts the touch roller 6 surface is calculated using the formula Tg<T3<Tg+110° C., the temperature range is 135° C.<T3<245° C.

The method for measuring the temperature of the film in the working examples was carried out using the following method.

The temperature of the film surface was measured using a contact type handy thermometer (Anritsu digital thermometer HA-100K). More specifically, the measurement was done at 5 points in the width direction of the conveyed film. At the time of measuring T3, the touch roller 6 was separated from its normal position and the temperature at the portion where the touch roller 6 pressed the melt film with a prescribed pressure onto the first cooling roller 5 surface was measured.

Working Examples 1-5 and Comparative Examples 1-7

These are performed in the same manner as Working Example 1, but the film temperature T1 at the casting die 4 exit, the film temperature T2 when the film first contacts the first cooling roller and the film temperature T3 when the film is nipped between the first cooling roller and the touch roller and pressed, are adjusted by changing the set temperature for the T-die 4, the relative position of the film with respect to the die 4, and the temperature of the wind-up roll. The film thickness changes in the width direction of the obtained samples were determined. The obtained results are shown in Table 1.

TABLE 1

|  | T1 | T2 | T3 | T1 − T2 | T2 − T3 | T1 − Tg | T2 − Tg | T3 − Tg | *1 |
|---|---|---|---|---|---|---|---|---|---|
| Working Example 1 | 240 | 210 | 200 | 30 | 10 | 106 | 75 | 65 | 0.2 |
| Working example 2 | 240 | 200 | 190 | 40 | 10 | 105 | 65 | 55 | 0.1 |
| Working example 3 | 240 | 190 | 180 | 50 | 10 | 105 | 55 | 45 | 0.2 |
| Working example 4 | 220 | 180 | 161 | 40 | 20 | 85 | 45 | 26 | 0.2 |
| Working Example 5 | 220 | 160 | 150 | 60 | 10 | 84 | 25 | 15 | 0.2 |
| Comparative example 1 | 240 | 230 | 180 | 10 | 50 | 105 | 95 | 45 | 3.6 |
| Comparative example 2 | 240 | 220 | 200 | 20 | 20 | 105 | 85 | 65 | 1.4 |
| Comparative example 3 | 240 | 200 | 160 | 40 | 40 | 105 | 65 | 25 | 1.3 |
| Comparative example 4 | 240 | 190 | 140 | 50 | 50 | 105 | 55 | 5 | 0.9 |
| Comparative example 5 | 240 | 170 | 160 | 70 | 10 | 105 | 35 | 25 | 0.7 |
| Comparative example 6 | 220 | 200 | 140 | 20 | 60 | 85 | 65 | 5 | 2.2 |
| Comparative example 7 | 220 | 180 | 140 | 40 | 40 | 85 | 45 | 5 | 1.3 |

*1: Change in film thickness (μm)

As is clear from the results of Table 1, the cellulose acetate propionate films of Working Examples 1-5 that were prepared under the manufacturing conditions of this invention have a smaller change in film thickness in the width direction than the cellulose acetate propionate films of Comparative Examples 1-7, and it was seen that it is possible to prepare films having little unevenness in thickness. Also in Table 1, those examples satisfying all the relationships (A) to (E) above are called working examples, while the others are called comparative examples, but Comparative Examples 3, 4 and 7 are working examples of claim 1 of this application and this change in film thickness is smaller than that for Comparative Examples 1, 2 and 6. Also, specific examples of the relationship between T1, T2, T3 and the die lines are described in Japanese Patent Application No. 2005-295502.

Working Example 2

In the Working Example 2, cellulose acetate propionate films are prepared using a wide width casting die 4 (width 2400 mm) compared to the 300 mm width casting die 4 used in the Working Example 1. The experiment conditions for the Working Example 2 are described in the following.

Cellulose Acetate Propionate 100 Parts by Weight (Degree of substitution of acetyl group: 1.4, Degree of substitution of propionyl group: 1.35, Number average molecular weight: 60,000; Note that the method for measuring degree of substitution of acyl groups such as acetyl group, propionyl group, butyryl group and the like is in accordance with ASTM-D817-96 regulations.)

Trimethylol propane tribenzoate (plasticizer) 10 parts by weight

Additive (IRGANOX XP 420/FD: Manufactured by Chiba Specialty Chemicals Company) 1 part by weight Ultraviolet light absorber Ti928 (Manufactured by Chiba Specialty Chemicals Company) 1.5 parts by weight.

Matting agent (Seahoster-KEP-30: Manufactured by Japan Catalyst, Silica particles with average particle diameter of 0.3 μm) 0.1 parts by weight The above materials were mixed for 30 minutes in a V-type mixer and then melted at 230° C. in a nitrogen gas environment using a biaxial extruder equipped with a strand die and cylindrical pellets with a length of 4 mm and diameter of 3 mm were formed. The obtained pellets were dried at 100° C. for 5 hours such that the water content was 100 ppm, and then supplied to a uniaxial extruder equipped with a casting die (GT-50; Manufactured by Plastics Kogaku Kenkyusho Inc.) to prepare a film. In the uniaxial extruder, the screw diameter is 90 mm, L/D=30, and rotation frequency of the screw was adjusted such that extrusion amount was 140 kg/h. Nitrogen gas is sealed from the vicinity of the material supply port, and a nitrogen atmosphere was maintained inside the extruder. The extruder and the casting die 4 were set to 240° C. The casting die 4 was the coat hanger type with a width of 2400 mm and the inner surface was subjected to hard chrome plating to obtain a mirror surface finish with a surface roughness of 0.01 S. The lip interval of the casting die 4 was set to 1 mm.

The film from the casting die 4 was dropped onto the first cooling roller with a chrome plated mirror surface and a roller width of 3000 mm whose temperature had been adjusted to 100° C. and simultaneously pressed by the touch roller 6 with a roller width of 2400 mm whose temperature had been adjusted to 100° C. The 2400 mm film from the casting die 4 was 2200 mm when dropped on the first cooling roller by the necking. The touch roller was pressed at a line pressure of 4 N/mm.

The film that had been pressed by the first cooling roller 5 and the touch roller 6 was conveyed to the second cooling roller and the third cooling roller and then after the film edge was slit by a slitter, the 2000 mm width film was wound by a winder.

Temperature Measurement for the Casting Film

The temperature of the film surface was measured using a contact type handy thermometer (Anritsu digital thermometer HA-100K). More specifically, the measurement was done at 5 points in the width direction of the conveyed film and the highest value was used as the film temperature.

At the time of measuring T3, the touch roller 6 was separated from its normal position and the temperature at the portion where the touch roller 6 pressed the melt film with a prescribed pressure onto the first cooling roller 5 surface was measured.

In Working Examples 11-28 and Comparative examples 11-13, the film temperature (T1) at the casting die 4 exit, the film temperature (T2) when the film first contacted the first cooling roller 5 and the film temperature (T3) when the film was nipped between the first cooling roller and the touch roller and pressed, the thickness (mm) of the metal roller portion, the crowning amount (μm), and the film thickness when nipped by the roller (μm) were changed under the above experimental conditions and samples were prepared.

The measurement of the smoothness of the film surface was done using a surface roughness meter which is SV3100S4 manufactured by Mitsuyoto. The tip of the tracer (diamond needle) has the shape of a 60-degree cone and the portion which contacts the surface has the shape of a sphere with a 2 μm radius of curvature. A load of 0.75 mN was applied to the tracer and the scanning speed at the time of measurement was set to 1.0 mm/sec and dispersion in the Z axis direction (thickness direction) was set to 0.001 μm. The range for measurement was a width of 20 mm from both ends respectively in the width direction of the film, and the tracer scanned the 20 mm width at the center in the width direction of the film and obtained measurement values. It is to be noted that the 20 mm width at the center in the width direction of the film is the range of ±10 mm from the width direction center of the film.

The vertical distance from the peak to the trough of the valley for the measured ranges of unevenness were read from the results of the surface roughness measurements, and the maximum value was used as the maximum unevenness height (nm). In addition, the incline is the relationship between the horizontal distance (L) from the peak to the trough and the height (H), and for each unevenness, the vertical distance (H) is divided by the horizontal distance (L) and the maximum value is used as the maximum unevenness incline.

The results are shown in Table 2 below.

TABLE 2

| | T1 (°C.) | T2 (°C.) | T3 (°C.) | T1 − T2 (°C.) | T2 − T3 (°C.) | T1 − T3 (°C.) | *1 | Crowning amount (μm) | *2 | Center portion *3 | Center portion *4 | End portion *3 | End portion *4 |
|---|---|---|---|---|---|---|---|---|---|---|---|---|---|
| *11 | 240 | 200 | 200 | 40 | 0 | 40 | 4 | 0 | 100 | 100 | 87 | 95 | 77 |
| *12 | 240 | 200 | 200 | 40 | 0 | 40 | 8 | 0 | 100 | 135 | 143 | 123 | 150 |
| *13 | 240 | 200 | 200 | 40 | 0 | 40 | 4 | 100 | 100 | 66 | 59 | 58 | 72 |
| *14 | 240 | 200 | 200 | 40 | 0 | 40 | 4 | 0 | 50 | 62 | 72 | 54 | 68 |
| *15 | 240 | 200 | 200 | 40 | 0 | 40 | 4 | 0 | 40 | 59 | 65 | 63 | 73 |

TABLE 2-continued

| | T1 (° C.) | T2 (° C.) | T3 (° C.) | T1 − T2 (° C.) | T2 − T3 (° C.) | T1 − T3 (° C.) | Crowning *1 | Crowning amount (μm) | *2 | Center portion *3 | Center portion *4 | End portion *3 | End portion *4 |
|---|---|---|---|---|---|---|---|---|---|---|---|---|---|
| *16 | 240 | 200 | 190 | 40 | 10 | 50 | 4 | 0 | 100 | 110 | 98 | 88 | 120 |
| *17 | 240 | 190 | 180 | 50 | 10 | 60 | 4 | 0 | 100 | 106 | 88 | 75 | 98 |
| *18 | 240 | 180 | 170 | 60 | 10 | 70 | 4 | 0 | 100 | 130 | 102 | 88 | 116 |
| *19 | 240 | 200 | 200 | 40 | 0 | 40 | 0.5 | 0 | 100 | 183 | 193 | 183 | 179 |
| *20 | 240 | 200 | 200 | 40 | 0 | 40 | 1 | 0 | 100 | 147 | 139 | 162 | 141 |
| *21 | 240 | 200 | 200 | 40 | 0 | 40 | 10 | 0 | 100 | 155 | 172 | 144 | 153 |
| *22 | 240 | 200 | 200 | 40 | 0 | 40 | 4 | 0 | 90 | 95 | 92 | 98 | 73 |
| *23 | 240 | 200 | 200 | 40 | 0 | 40 | 4 | 0 | 80 | 81 | 75 | 64 | 77 |
| *24 | 240 | 200 | 200 | 40 | 0 | 40 | 4 | 0 | 15 | 91 | 81 | 86 | 72 |
| *25 | 240 | 200 | 200 | 40 | 0 | 40 | 4 | 0 | 12 | 102 | 94 | 112 | 93 |
| *26 | 240 | 210 | 210 | 30 | 0 | 30 | 4 | 0 | 100 | 105 | 94 | 102 | 113 |
| *27 | 240 | 180 | 180 | 60 | 0 | 60 | 4 | 0 | 100 | 114 | 112 | 121 | 102 |
| *28 | 240 | 200 | 180 | 40 | 20 | 60 | 4 | 0 | 100 | 122 | 105 | 118 | 120 |
| **11 | 240 | 230 | 150 | 10 | 80 | 90 | 4 | 0 | 100 | 385 | 289 | 406 | 395 |
| **12 | 240 | 230 | 150 | 10 | 80 | 90 | 4 | 0 | 50 | 496 | 460 | 562 | 639 |
| **13 | 240 | 220 | 215 | 20 | 5 | 25 | 4 | 0 | 100 | 230 | 60 | 269 | 88 |
| *29 | 240 | 200 | 180 | 40 | 0 | 40 | 12 | 0 | 100 | 224 | 255 | 187 | 254 |

*Working example,
**Comparative example,
*1: Metal roller portion thickness (mm)
*2: Film thickness when nipped by roller (μm)
*3: Maximum height of unevenness (nm),
*4: Maximum incline of unevenness (nm)

As is clear from the results of Table 2, the cellulose acetate propionate films of Working Examples 11-29 that were prepared under the manufacturing conditions of this invention have a smaller maximum unevenness height at the center and end than the cellulose acetate propionate films of Comparative Examples 11-13, and it was seen that it is possible to prepare films having little maximum unevenness incline.

In addition, Working Example 13 in which the cellulose acetate propionate film was prepared using the touch roll 6 having a crowning amount of 100 μm, the maximum unevenness height at the center and end is smaller than in Working Example 11 in which cellulose acetate propionate film is prepared using the touch roll 6 having a crowning amount of 0 μm under the same conditions of T1, T2, T3, metal roll portion thickness, film thickness when nipped by the roller. Also, films were prepared in which the maximum unevenness incline was small.

In addition, in Working Examples 11, 20, 21 in which the cellulose acetate propionate films were prepared such that the thickness of the metal roller portion of the touch roller 6 is within the range 1 mm-10 mm have a smaller maximum unevenness height at the center and end than in Working Examples 19 in which cellulose acetate propionate film is prepared using the touch roll having a different thickness of a metal roll portion under the same conditions of T1, T2, T3, crowning amount, film thickness when nipped by the roller. Also, films were prepared in which the maximum unevenness incline was small.

As described above, it was confirmed that with the conditions and apparatus specifications of this invention, the center and end of the film surface have excellent smoothness.

What is claimed is:

1. An optical film producing method, comprising steps of:
   extruding a melted material including a melted cellulose ester resin from a casting die by using an extruding device;
   forming a film by pressing the extruded melted material between a first rotating member and a second rotating member; and
   winding up the formed film,
   wherein the following formulas are satisfied:

$30° C. \leq T1-T2 \leq 60° C.$ $0° C. \leq T2-T3 \leq 20° C.$ $Tg < T3$ where T1 is the temperature on an outer surface of the melted material at an exit of the casting die, T2 is the temperature on an outer surface of the film at a point where the film firstly contacts the first rotating member, T3 is the temperature measured on an outer surface of the film at a point where the film is pressed between the first rotating member and the second rotating member by separating the first rotating member from the film and thereafter measuring T3, and Tg is the glass transition temperature of the film and wherein the outer surface is a surface being not in contact with the casting die or the first rotating member.

2. The optical film producing method described in claim 1, wherein T1 is set within a temperature range represented by the formula of (Tg+60° C.<T1<Tg+130° C.).

3. The optical film producing method described in claim 1, wherein T2 is set within a temperature range represented by the formula of (Tg<T2<Tg+120° C.).

4. The optical film producing method described in claim 1, wherein T3 is set within a temperature range represented by the formula of (T3<Tg+110° C.).

5. The optical film producing method described in claim 1, wherein the surface of the second rotating member is structured with a metal having a thickness of 1 mm to 10 mm.

6. The optical film producing method described in claim 5, wherein the second rotating member has a roll form in which the external diameter at a central portion thereof is larger than the external diameters of both end portions thereof.

7. The optical film producing method described in claim 6, wherein the process of forming a film by pressing the extruded melted material between a first rotating member and a second rotating member makes an average film thickness to be 15 μm to 80 μm.

8. The optical film producing method described in claim 1, wherein the width of the casting die exit along a longitudinal direction of the casting die exit is 1500 mm to 4000 mm.

9. The optical film producing method described in claim 1, wherein each of the first rotating member and the second rotating member is a cooling member to cool the extruded melted material.

10. The optical film producing method described in claim 9, wherein the temperature on the surface of each of the first rotating member and the second rotating member is lower than the glass transition temperature of the film.

11. The optical film producing method described in claim 1, wherein the first rotating member has a mirror surface and the second rotating member has a smooth surface.

12. The optical film producing method described in claim 11, wherein the second rotating member has surface roughness of 0.2 S or less.

13. The optical film producing method described in claim 6, wherein a difference in external diameter is 50 μm to 300 μm.

* * * * *